US012647217B2

(12) United States Patent
Kittichokechai et al.

(10) Patent No.: US 12,647,217 B2
(45) Date of Patent: Jun. 2, 2026

(54) TYPE-1 HARQ-ACK CODEBOOK FOR SPS HARQ-ACK DEFERRAL

(71) Applicant: TELEFONAKTIEBOLAGET LM ERICSSON (PUBL), Stockholm (SE)

(72) Inventors: Kittipong Kittichokechai, Järfälla (SE); Mattias Andersson, Sundbyberg (SE); Sorour Falahati, Stockholm (SE); Bikramjit Singh, Raasepori (FI); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 300 days.

(21) Appl. No.: 18/285,755

(22) PCT Filed: Apr. 5, 2022

(86) PCT No.: PCT/IB2022/053182
§ 371 (c)(1),
(2) Date: Oct. 5, 2023

(87) PCT Pub. No.: WO2022/214972
PCT Pub. Date: Oct. 13, 2022

(65) Prior Publication Data
US 2024/0195536 A1 Jun. 13, 2024

Related U.S. Application Data

(60) Provisional application No. 63/170,980, filed on Apr. 5, 2021.

(51) Int. Cl.
H04L 1/1829 (2023.01)
H04L 5/00 (2006.01)
(Continued)

(52) U.S. Cl.
CPC .......... H04L 1/1854 (2013.01); H04L 5/0053 (2013.01); H04W 72/0446 (2013.01); H04W 72/11 (2023.01)

(58) Field of Classification Search
CPC .... H04L 1/1854; H04L 5/0053; H04W 72/11; H04W 72/0446
(Continued)

(56) References Cited

U.S. PATENT DOCUMENTS

| | | | | |
|---|---|---|---|---|
| 10,735,146 B2 * | 8/2020 | Wang | ..................... | H04L 1/1854 |
| 10,790,942 B2 * | 9/2020 | Wang | ................... | H04B 7/0626 |

(Continued)

FOREIGN PATENT DOCUMENTS

| | | | | | |
|---|---|---|---|---|---|
| CN | 113519194 A | * | 10/2021 | ............ | H04W 72/21 |
| EP | 3700292 B1 | * | 4/2022 | ............ | H04W 72/23 |

(Continued)

OTHER PUBLICATIONS

CMCC, "Discussion on UE feedback enhancements for HARQ-ACK", 3GPP TSG RAN WG1 #104-e, R1-2101039, e-Meeting, Jan. 25-Feb. 5, 2021.
(Continued)

*Primary Examiner* — Anthony Mejia

(57) ABSTRACT

A method, system and apparatus are disclosed. According to some embodiments, a wireless device is provided. The wireless device includes processing circuitry configured to generate a first HARQ-ACK codebook for a first uplink time slot, where the first HARQ-5 ACK codebook includes a first plurality of HARQ-ACK bits, to determine a second plurality of HARQ-ACK bits, where each of the second plurality of HARQ-ACK bits is associated with a respective timing parameter, and each of the second plurality of HARQ-ACK bits is mapped to a respective downlink time slot of a plurality of downlink time slots based on the respective
(Continued)

One resource element

One OFDM symbol including cyclic prefix timing parameter, to modify the first HARQ-ACK codebook based on at least one 0 deferred HARQ-ACK bit of the second plurality of HARQ-ACK bits, and to cause transmission of the modified first HARQ-ACK codebook during the first uplink time slot.

21 Claims, 18 Drawing Sheets

(51) Int. Cl.
    *H04W 72/0446*     (2023.01)
    *H04W 72/11*     (2023.01)
(58) Field of Classification Search
    USPC ............................................... 370/336
    See application file for complete search history.

(56)           References Cited

U.S. PATENT DOCUMENTS

| | | | | |
|---|---|---|---|---|
| 11,483,099 | B2 * | 10/2022 | Park | H04B 7/024 |
| 11,737,091 | B2 * | 8/2023 | Choi | H04W 24/08 |
| | | | | 370/329 |
| 12,232,130 | B2 * | 2/2025 | Gou | H04W 72/0446 |
| 12,232,162 | B2 * | 2/2025 | Park | H04L 1/1854 |
| 2019/0132093 | A1 * | 5/2019 | Aiba | H04L 1/1861 |
| 2023/0164774 | A1 * | 5/2023 | Fröberg Olsson | H04L 5/0053 |
| | | | | 370/329 |
| 2023/0299891 | A1 * | 9/2023 | Kittichokechai | H04L 1/1896 |
| | | | | 370/336 |

FOREIGN PATENT DOCUMENTS

| | | | | |
|---|---|---|---|---|
| EP | 4429144 | A2 * | 9/2024 | ........ H04W 72/0446 |
| WO | 2022091561 | A1 | 5/2022 | |

OTHER PUBLICATIONS

NEC, "UE feedback enhancement for HARQ-ACK", 3GPP TSG RAN WG1 #104-e, R1-2100948, e-Meeting, Jan. 25-Feb. 5, 2021.

Sony, "Considerations on HARQ-ACK enhancements for URLLC", 3GPP TSG RAN WG1 #104-e, R1-2100855, e-Meeting, Jan. 25-Feb. 5, 2021.

TCL Communication, "UE feedback enhancements for HARQ-ACK", 3GPP TSG RAN WG1 Meeting #104-e, R1-2100920, e-Meeting, Jan. 25-Feb. 5, 2021.

3GPP, "3rd Generation Partnership Project; Technical Specification Group Radio Access Network; NR; Physical layer procedures for control (Release 16)", 3GPP TS 38.213 V16.4.0, Dec. 2020, 1-181.

Ericsson, "HARQ-ACK Enhancement for IIoT/URLLC", 3GPP TSG-RAN WG1 Meeting #104-e, R1-2100268, E- meeting, Jan. 25-Feb. 5, 2021.

Lenovo et al., "HARQ-ACK feedback enhancement for IIoT/URLLC", 3GPP TSG RAN WG1 #104-e, R1-2100993, e- Meeting, Jan. 25-Feb. 5, 2021.

* cited by examiner

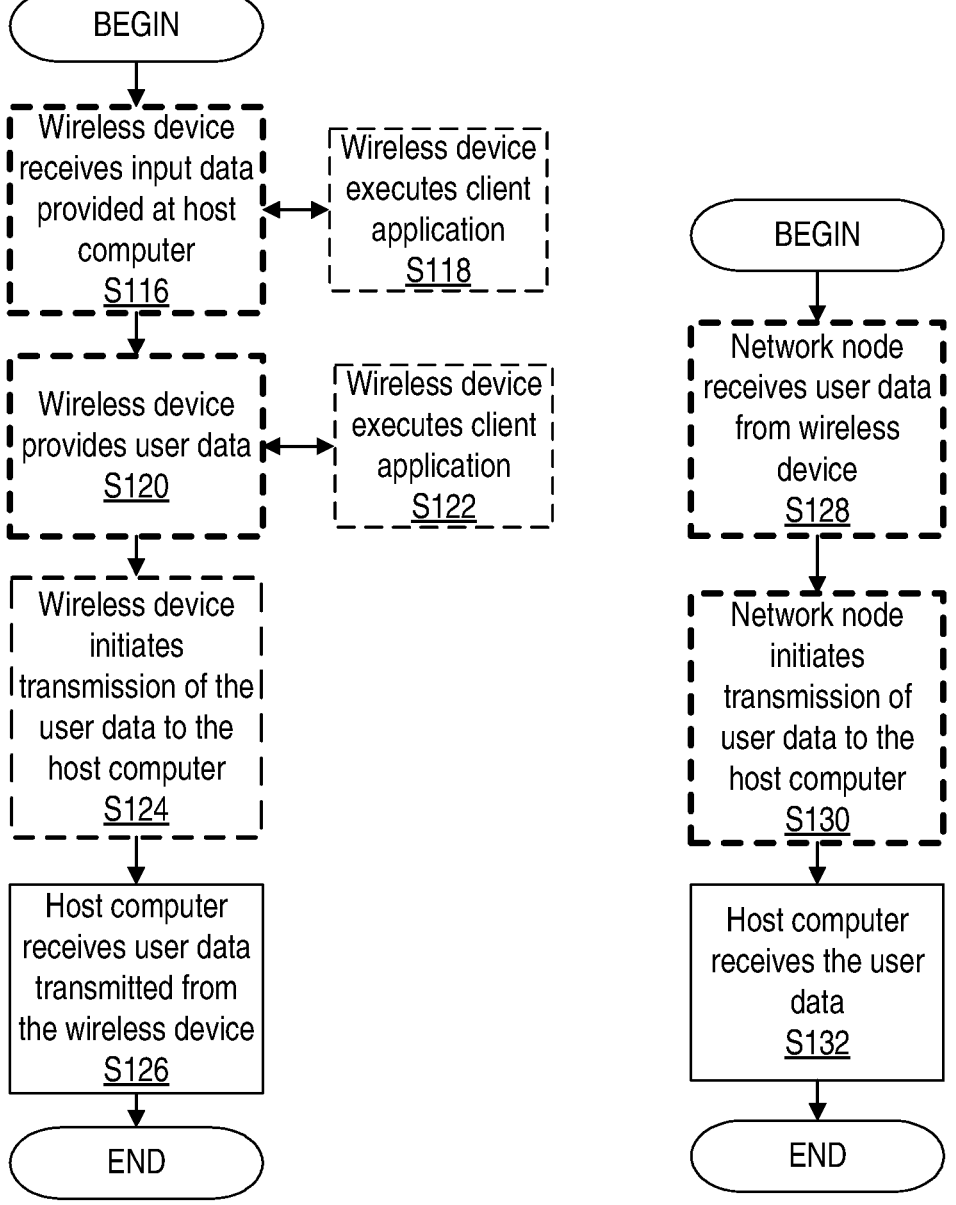
FIG. 10                         FIG. 11

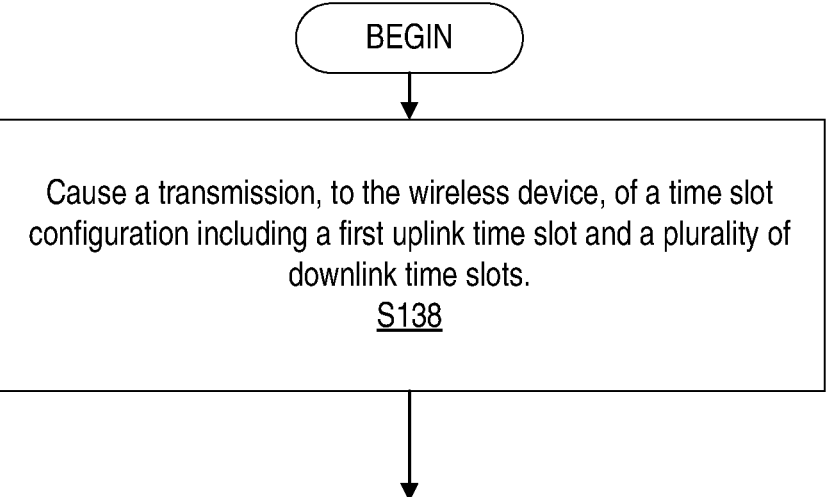

BEGIN

Cause a transmission, to the wireless device, of a time slot configuration including a first uplink time slot and a plurality of downlink time slots.
S138

Receive a modified first HARQ-ACK codebook from the wireless device during the first uplink time slot, the modified first HARQ-ACK codebook including a first plurality of HARQ-ACK bits associated with a first HARQ-ACK codebook and at least one deferred HARQ-ACK bit associated with a second plurality of HARQ-ACK bits, each of the first plurality of HARQ-ACK bits being mapped to the first uplink time slot based on a respective timing parameter, each of the second plurality of HARQ-ACK bits being mapped to a respective downlink time slot of the plurality of downlink time slots based on a respective timing parameter
S140

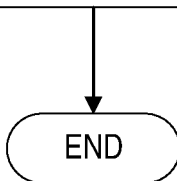

END

FIG. 13

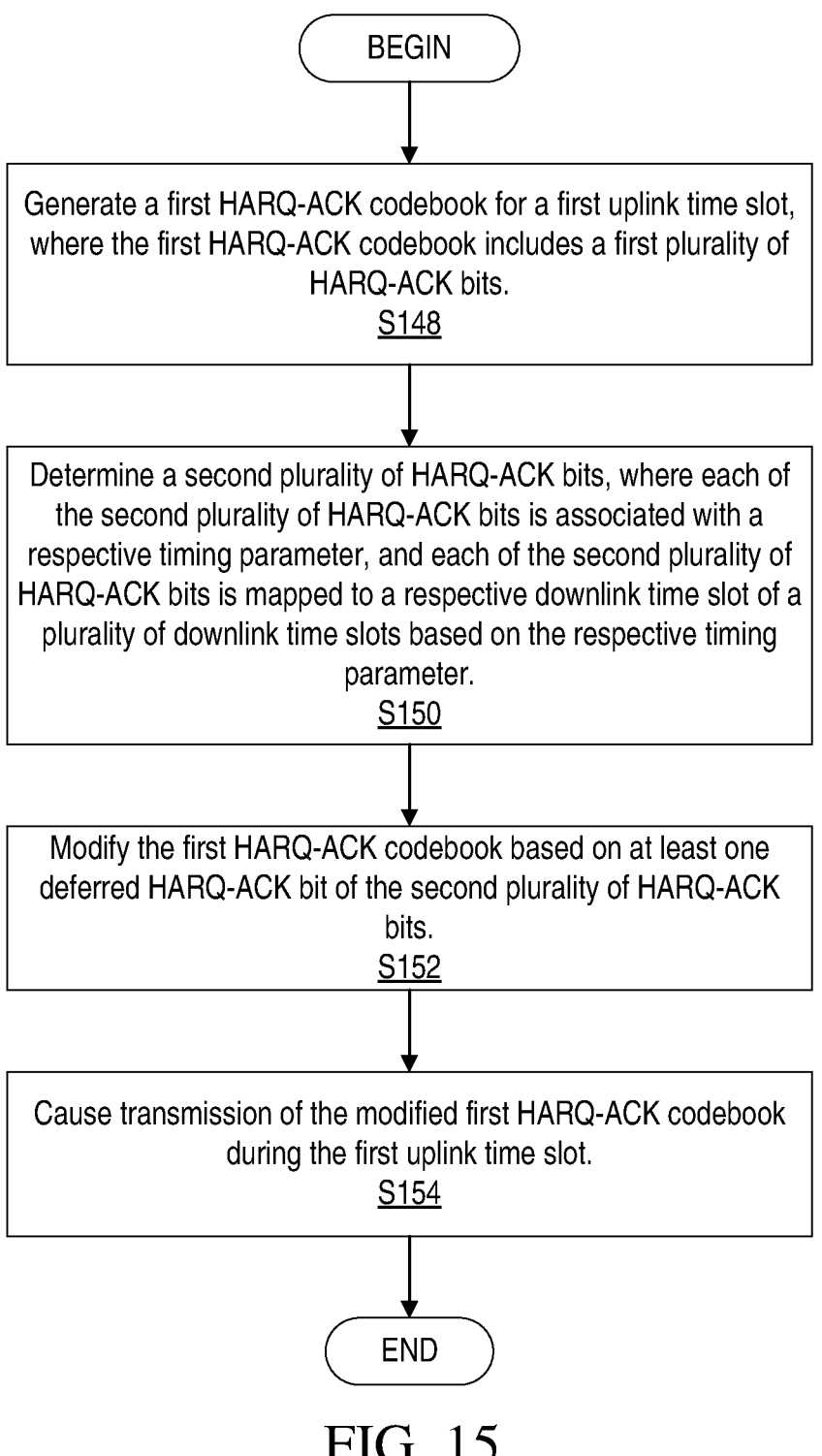

BEGIN

Generate a first HARQ-ACK codebook for a first uplink time slot, where the first HARQ-ACK codebook includes a first plurality of HARQ-ACK bits.
S148

Determine a second plurality of HARQ-ACK bits, where each of the second plurality of HARQ-ACK bits is associated with a respective timing parameter, and each of the second plurality of HARQ-ACK bits is mapped to a respective downlink time slot of a plurality of downlink time slots based on the respective timing parameter.
S150

Modify the first HARQ-ACK codebook based on at least one deferred HARQ-ACK bit of the second plurality of HARQ-ACK bits.
S152

Cause transmission of the modified first HARQ-ACK codebook during the first uplink time slot.
S154

END

TYPE-1 HARQ-ACK CODEBOOK FOR SPS HARQ-ACK DEFERRAL

CROSS-REFERENCE TO RELATED APPLICATION

This application is a national phase application of International Patent Application No. PCT/IB2022/053182, filed Apr. 5, 2022, which claims priority to U.S. Provisional Application No. 63/170,980, filed Apr. 5, 2021, the disclosures of which are hereby incorporated by reference in their entirety.

FIELD

The present disclosure relates to wireless communications, and in particular, to modified slot timing values for HARQ transmission such as, for example, deferred HARQ transmission.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

In particular, the NR standard in 3GPP is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed in order to reduce latency. A mini-slot is a concept that is used in scheduling and in the downlink (DL) a mini-slot can consist of 2, 4 or 7 Orthogonal Frequency Division Multiplexing (OFDM) symbols, while in the uplink (UL) a mini-slot can be any number of 1 to 14 OFDM symbols. The concepts of slot and mini-slot are not specific to a specific service meaning that a mini-slot may be used for either eMBB, URLLC, or other services. FIG. 1 is a diagram of a radio resource in NR.

Downlink Control Information

In the 3GPP NR standard, downlink control information (DCI) which is transmitted in physical downlink control channel (PDCCH), is used to indicate the DL data related information, UL related information, power control information, slot format indication, etc. There are different formats of DCI associated with each of these control signals and the wireless device identifies them based on different radio network temporary identifiers (RNTIs).

The wireless device is configured by higher layer signaling to monitor for DCIs in different resources with different periodicities, etc. DCI formats 1_0, 1_1, and 1_2 are used for scheduling DL data which is sent in physical downlink shard channel (PDSCH), and includes time and frequency resources for DL transmission, as well as modulation and coding information, HARQ (hybrid automatic repeat request) information, etc.

In cases of DL semi-persistent scheduling (SPS) and UL configured grant type 2, part of the scheduling including the periodicity is provided by the higher layer configurations, while the rest of scheduling information such as time domain and frequency domain resource allocation, modulation and coding, etc., are provided by the DCI in PDCCH.

Uplink Control Information

Uplink control information (UCI) is a control information sent by a wireless device to a network node. UCI may include:

Hybrid-ARQ acknowledgement (HARQ-ACK) which is a feedback information corresponding to the received downlink transport block whether the transport block reception is successful or not, Channel state information (CSI) related to downlink channel conditions which provides the network node with channel-related information useful for DL scheduling, including information for multi-antenna and beamforming schemes, and Scheduling request (SR) which indicates a need of UL resources for UL data transmission.

UCI is typically transmitted on physical uplink control channel (PUCCH). However, if a wireless device is transmitting data on the physical uplink shared channel (PUSCH) with a valid PUSCH resource overlapping with PUCCH, UCI can be multiplexed with UL data and transmitted on PUSCH instead, if the timeline requirements for UCI multiplexing is met.

Physical Uplink Control Channel

Physical Uplink Control Channel (PUCCH) is used by a wireless device to transmit HARQ-ACK feedback message corresponding to the reception of DL data transmission. It is also used by the wireless device to send channel state information (CSI) or to request for an uplink grant for transmitting UL data.

In NR, there exist multiple PUCCH formats supporting different UCI payload sizes. PUCCH formats 0 and 1 support UCI up to 2 bits, while PUCCH formats 2, 3, and 4 can support UCI of more than 2 bits. In terms of PUCCH transmission duration, PUCCH formats 0 and 2 are considered short PUCCH formats supporting PUCCH duration of 1 or 2 OFDM symbols, while PUCCH formats 1, 3, and 4 are considered as long formats and can support PUCCH duration from 4 to 14 symbols.

HARQ Feedback

The procedure for receiving downlink transmission is that the wireless device first monitors and decodes a PDDCH in slot n which points to a DL data scheduled in slot $n+K_0$ slots ($K_0$ is larger than or equal to 0). The wireless device then decodes the data in the corresponding PDSCH. Finally based on the outcome of the decoding, the wireless device sends an acknowledgement of the correct decoding (ACK) or a negative acknowledgement (NACK) to the network node (e.g., gNB) at time slot $n+K_0+K_1$ (in case of slot aggregation $n+K_0$ would be replaced by the slot where PDSCH ends). Both of $K_0$ and $K_1$ are indicated in the DCI. The resources for sending the acknowledgement are indicated by PUCCH resource indicator (PRI) field in the DCI, which points to one of PUCCH resources that are configured by higher layers.

Depending on DL/UL slot configurations, or whether carrier aggregation, or per code-block group (CBG) transmission used in the DL, the feedback for several PDSCHs may need to be multiplexed in one feedback. This is performed by constructing HARQ-ACK codebooks. In NR, the wireless device can be configured to multiplex the Ack/Nack (A/N) bits using a semi-static codebook or a dynamic codebook.

Type 1 or semi-static codebook includes a bit sequence where each element contains the A/N bit from a possible allocation in a certain slot, carrier, or transport block (TB). When the wireless device is configured with CBG and/or time-domain resource allocation (TDRA) table with multiple entries, multiple bits are generated per slot and Tb, as described below. The codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not, a bit is reserved in the feedback matrix.

In cases when a wireless device has a TDRA table with multiple time-domain resource allocation entries configured: The table may be pruned (i.e., entries are removed based on a specified algorithm) to derive a TDRA table that only contains non-overlapping time-domain allocations. One bit is then reserved in the HARQ CB for each non-overlapping entry (assuming a wireless device is capable of supporting reception of multiple PDSCH in a slot).

The description of how the wireless device constructs Type-1 HARQ-ACK codebook to be transmitted in physical uplink control channel is described in 3GPP specifications/standards such as in, for example, Section 9.1.2.1 of 3GPP Technical Specification (TS) 38.213.

To avoid reserving unnecessary bits in a semi-static HARQ codebook, in NR a wireless device can be configured to use a type 2 or dynamic HARQ codebook, where an A/N bit is present only if there is a corresponding transmission scheduled. To avoid any confusion between the network node and the wireless device, on the number of PDSCHs that the wireless device has to send a feedback for, a counter downlink assignment indicator (DAI) field exists in DL assignment, which denotes accumulative number of {serving cell, PDCCH occasion} pairs in which a PDSCH is scheduled to a wireless device up to the current PDCCH. In addition to that, there is another field called total DAI, which when present shows the total number of {serving cell, PDCCH occasion} up to (and including) all PDCCHs of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

FIG. 2 is a diagram of an example timeline in a scenario with two PDSCHs and one feedback. In this example there is in total 4 PUCCH resources configured, and the PRI indicates PUCCH 2 to be used for HARQ feedback. It is described below how PUCCH 2 is selected from 4 PUCCH resources based on the procedure in 3GPP Release 15 (Rel-15, also referred to as 3GPP Rel-15 and/or NR Rel-15).

In NR Rel-15, a wireless device can be configured with maximum 4 PUCCH resource sets for transmission of HARQ-ACK information. Each set is associated with a range of UCI payload bits including HARQ-ACK bits. The first set is always associated to 1 or 2 HARQ-ACK bits and hence includes only PUCCH format 0 or 1 or both. The range of payload values (minimum of maximum values) for other sets, if configured, is provided by configuration except the maximum value for the last set where a default value is used, and the minimum value of the second set being 3. The first set can include maximum 32 PUCCH resources of PUCCH format 0 or 1. Other sets can include maximum 8 bits of format 2 or 3 or 4.

As described previously, the wireless device determines a slot for transmission of HARQ-ACK bits in a PUCCH corresponding to PDSCHs scheduled or activated by DCI via $K_1$ value provided by configuration or a field in the corresponding DCI. The wireless device forms a codebook from the HARQ-ACK bits with associated PUCCH in a same slot via corresponding $K_1$ values.

The wireless device determines a PUCCH resource set that the size of the codebook is within the corresponding range of payload values associated to that set.

The wireless device determines a PUCCH resource in that set if the set is configured with maximum 8 PUCCH resources, by a field in the last DCI associated to the corresponding PDSCHs. If the set is the first set and is configured with more than 8 resources, a PUCCH resource in that set is determined by a field in the last DCI associated to the corresponding PDSCHs and implicit rules based on the control channel element (CCE).

A PUCCH resource for HARQ-ACK transmission can overlap in time with other PUCCH resources for CSI and/or scheduling request (SR) transmissions as well as PUSCH transmissions in a slot. In case of overlapping PUCCH and/or PUSCH resources, first the wireless device resolves overlapping between PUCCH resources, if any, by determining a PUCCH resource carrying the total UCI (including HARQ-ACK bits) such that the UCI multiplexing timeline requirements are met. There might be partial or complete dropping of CSI bits, if any, to multiplex the UCI in the determined PUCCH resource. Then, the wireless device resolves overlapping between PUCCH and PUSCH resources, if any, by multiplexing the UCI on the PUSCH resource if the timeline requirements for UCI multiplexing is met.

Sub-Slot HARQ-ACK

In NR Rel-16, an enhancement on HARQ-ACK feedback is made to support more than one PUCCH carrying HARQ-ACK in a slot for supporting different services and for possible fast HARQ-ACK feedback for URLLC. This lead to an introduction of a new HARQ-ACK timing in a unit of sub-slot, i.e., $K_1$ indication in a unit of sub-slot. Sub-slot configurations for PUCCH carrying HARQ-ACK can be configured from the two options, namely "2-symbol*7" and "7-symbol*2" for the sub-slot length of 2 symbols and 7 symbols, respectively. The indication of K1 is the same as that of 3GPP Rel-15, that is, $K_1$ is indicated in the DCI scheduling PDSCH. To determine the HARQ-ACK timing, there exists an association of PDSCH to sub-slot configuration in that if the scheduled PDSCH ends in sub-slot n, the corresponding HARQ-ACK is reported in sub-slot $n+K_1$. In a sense, sub-slot based HARQ-ACK timing works similarly to that of 3GPP Rel-15 slot-based procedure by replacing the unit of $K_1$ from slot to sub-slot.

There exist some limitations on PUCCH resources for sub-slot HARQ-ACK. That is, only one PUCCH resource configuration is used for all sub-slots in a slot. Moreover, any PUCCH resource for sub-slot HARQ-ACK cannot cross sub-slot boundaries.

FIG. 3 is a diagram of an example where each PDSCH is associated with a certain sub-slot for HARQ feedback through the use of a $K_1$ value in units of sub-slots where the K1 indication is based on sub-slots with 7-symbol*2 configuration for 2 PUCCHs in two sub-slots that carry HARQ feedback of PDSCH transmissions.

HARQ Feedback for SPS PDSCH

For a SPS PDSCH reception, the wireless device transmits HARQ-ACK feedback to the network node. The timing of the HARQ-ACK feedback is determined by PDSCH-to-HARQ_feedback timing indicator field, if present, in a DCI format activating the SPS PDSCH reception. Otherwise, it is provided by a higher layer parameter dl-DataToUL-ACK. PUCCH resource determination and HARQ-ACK codebook generation for SPS HARQ-ACK may follow the procedure described in the "HARQ feedback" section.

SPS HARQ-ACK Deferral

A wireless device can be indicated or configured with the HARQ-ACK timing value, e.g., $K_1$, for a SPS configuration. This HARQ-ACK timing value is applied to all SPS PDSCH occasions of the activated SPS configuration.

In TDD operation with asymmetric DL/UL TDD pattern, if short SPS periodicity is used, it can happen that the SPS periodicity value does not match with the TDD pattern when it comes to HARQ-ACK feedback timing. It may happen that the HARQ-ACK timing value $K_1$ does not indicate a valid UL slot for all SPS PDSCH occasions. This is illustrated in the example of FIG. 4 with a single SPS configuration with periodicity of 1 slot where the indicated K1 does not match with the 'DDDU' semi-static TDD pattern. With $K_1=3$ slots, HARQ-ACK feedback for the second and third SPS occasions would fall into DL slots, and thus these HARQ-ACK would be dropped.

It has been considered to address above issue by allowing SPS HARQ-ACK which would otherwise be dropped to be deferred to a next available UL slot instead. Complete details to support the solution are still under discussion in 3GPP. For example, one open issue to fully support SPS HARQ-ACK deferral is on Type-1 HARQ-ACK codebook. In principle, SPS HARQ-ACK deferral implies that the actual K1 value for the deferred SPS HARQ-ACK can change to another value compared to the initially indicated or configured one. The existing Type-1 HARQ-ACK codebook construction does not fully support the SPS HARQ-ACK deferral since it only considers HARQ-ACK bits which correspond to the set of configured $K_1$ values.

One example of the mentioned problem is illustrated in the diagram of FIG. 5 where it is assumed that the set of K1 values {0,1,2,4} is configured to the wireless device and $K_1=1$ is indicated in the activation DCI. In the example, SPS HARQ-ACK corresponding to the SPS PDSCH with $K_1=1$ would fall into the DL slot which does not have any valid symbols for UL transmission, and would thus be deferred to the next available UL slot, denoted in this example as slot $n_u$. This essentially means that the deferred SPS HARQ-ACK is transmitted in a slot which corresponds to actual $K_1=3$ with respect to the SPS PDSCH. However, the existing Type-1 HARQ-ACK codebook construction for slot $n_u$ will not reserve a place holder in the codebook for this deferred SPS HARQ-ACK bit since $K_1=3$ is not in the set of configured $K_1$ values. This disadvantageously leads to a mismatch in the codebook generation.

SUMMARY

Some embodiments advantageously provide methods, systems, and apparatuses for modified slot timing values for HARQ transmission such as, for example, deferred HARQ transmission.

One or more embodiments described herein provide methods to fully support Type-1 HARQ-ACK codebook for SPS HARQ-ACK deferral. In particular, the present disclosure provides solutions to help ensure that deferred SPS HARQ-ACK is included in the codebook when necessary.

The solutions include one or more methods of modifying the set of K1 values used in Type-1 codebook construction as well as methods to append the deferred SPS HARQ-ACK bits in the codebook when needed.

Hence, SPS HARQ-ACK deferral is supported in 3GPP Rel-17 to address the issue of SPS HARQ-ACK dropping in TDD due to mismatch between SPS period and TDD pattern. Type-1 HARQ-ACK codebook may be essential for URLLC as it provides robustness for feedback transmission against any DCI misdetection at the wireless device. One or more embodiments described herein allows Type-1 HARQ-ACK codebook for SPS HARQ-ACK deferral to be fully supported and ensure that both features are fully functional.

According to one aspect of the present disclosure, a wireless device configured to communicate with a network node is provided. The wireless device includes processing circuitry configured to generate a first HARQ-ACK codebook for a first uplink time slot, where the first HARQ-ACK codebook includes a first plurality of HARQ-ACK bits. The processing circuitry is further configured to determine a second plurality of HARQ-ACK bits, where each of the second plurality of HARQ-ACK bits is associated with a respective timing parameter, and each of the second plurality of HARQ-ACK bits is mapped to a respective downlink time slot of a plurality of downlink time slots based on the respective timing parameter. The processing circuitry is further configured to modify the first HARQ-ACK codebook based on at least one deferred HARQ-ACK bit of the second plurality of HARQ-ACK bits and cause transmission of the modified first HARQ-ACK codebook during the first uplink time slot.

According to one or more embodiments of this aspect, each of the first plurality of HARQ-ACK bits is associated with a respective timing parameter, and each of the first plurality of HARQ-ACK bits is mapped to the first uplink time slot based on the respective timing parameter.

According to one or more embodiments of this aspect, each of the respective timing parameters is based on a periodicity of a semi-persistent scheduling, SPS, configuration associated with each of first and second pluralities of HARQ-ACK bits.

According to one or more embodiments of this aspect, each of the at least one deferred HARQ-ACK bit has a respective deferral value less than a maximum deferral value, where the respective deferral value is determined based on a delay from the respective downlink time slot to the first uplink time slot.

According to one or more embodiments of this aspect, modifying the first HARQ-ACK codebook includes at least one of appending the selected at least one deferred HARQ-ACK bit to the first HARQ-ACK codebook, and prepending at least one deferred HARQ-ACK bit to the first HARQ-ACK codebook.

According to one or more embodiments of this aspect, modifying the first HARQ-ACK codebook includes generating a deferred HARQ-ACK codebook based on the at least one deferred HARQ-ACK bit, and at least one of appending the deferred HARQ-ACK codebook to the first HARQ-ACK codebook and prepending the deferred HARQ-ACK codebook to the first HARQ-ACK codebook.

According to one or more embodiments of this aspect, the at least one deferred HARQ-ACK bit includes a plurality of deferred HARQ-ACK bits, the generating the deferred HARQ-ACK codebook including aggregating the plurality of deferred HARQ-ACK bits.

According to one or more embodiments of this aspect, modifying of the first HARQ-ACK codebook based on the at least one deferred HARQ-ACK bit includes determining the at least one deferred HARQ-ACK bit based on a periodicity of a semi-persistent scheduling, SPS, configuration associated with the at least one deferred HARQ-ACK bit.

According to another aspect of the present disclosure, a network node configured to communicate with a wireless device is provided. The network node includes processing circuitry configured to cause a transmission to the wireless device of a time slot configuration which includes a first uplink time slot and a plurality of downlink time slots. The processing circuitry is further configured to receive a modified first HARQ-ACK codebook from the wireless device during the first uplink time slot, where the modified first HARQ-ACK codebook includes a first plurality of HARQ-ACK bits associated with a first HARQ-ACK codebook and at least one deferred HARQ-ACK bit associated with a second plurality of HARQ-ACK bits. Each of the first plurality of HARQ-ACK bits is mapped to the first uplink time slot based on a respective timing parameter, and each of the second plurality of HARQ-ACK bits is mapped to a respective downlink time slot of the plurality of downlink time slots based on a respective timing parameter.

According to one or more embodiments of this aspect, the processing circuitry is further configured to cause a first downlink transmission to the wireless device on a first downlink time slot of the plurality of downlink time slots, where the first downlink transmission is associated with at least one of the first plurality of HARQ-ACK bits, and to cause a second downlink transmission to the wireless device on a second downlink time slot of the plurality of downlink time slots, where the second downlink transmission is associated with at least one of the second plurality of HARQ-ACK bits.

According to one or more embodiments of this aspect, each of the respective timing parameters is based on a periodicity of a semi-persistent scheduling, SPS, configuration associated with each of first and second pluralities of HARQ-ACK bits.

According to one or more embodiments of this aspect, each of the at least one deferred HARQ-ACK bit has a respective deferral value less than a maximum deferral value, where the respective deferral value is associated with a delay from the respective downlink time slot to the first uplink time slot.

According to one or more embodiments of this aspect, the modified first HARQ-ACK codebook includes the at least one deferred HARQ-ACK bit, the at least one deferred HARQ-ACK bit being at least one of appended to the first HARQ-ACK codebook, and prepended to the first HARQ-ACK codebook.

According to one or more embodiments of this aspect, the modified first HARQ-ACK codebook includes a deferred HARQ-ACK codebook associated with the at least one deferred HARQ-ACK bit, the deferred HARQ-ACK codebook being at least one of appended to the first HARQ-ACK codebook, and prepended to the first HARQ-ACK codebook.

According to one or more embodiments of this aspect, the at least one deferred HARQ-ACK bit includes a plurality of deferred HARQ-ACK bits, the deferred HARQ-ACK codebook including an aggregation of the plurality of deferred HARQ-ACK bits.

According to another aspect of the present disclosure, a method implemented in a wireless device configured to communicate with a network node is provided. The method includes generating a first HARQ-ACK codebook for a first uplink time slot, where the first HARQ-ACK codebook includes a first plurality of HARQ-ACK bits. The method further includes determining a second plurality of HARQ-ACK bits, where each of the second plurality of HARQ-ACK bits is associated with a respective timing parameter, and each of the second plurality of HARQ-ACK bits is mapped to a respective downlink time slot of a plurality of downlink time slots based on the respective timing parameter. The method further includes modifying the first HARQ-ACK codebook based on at least one deferred HARQ-ACK bit of the second plurality of HARQ-ACK bits, and transmitting the modified first HARQ-ACK codebook during the first uplink time slot.

According to one or more embodiments of this aspect, each of the first plurality of HARQ-ACK bits is associated with a respective timing parameter, and each of the first plurality of HARQ-ACK bits is mapped to the first uplink time slot based on the respective timing parameter.

According to one or more embodiments of this aspect, each of the respective timing parameters is based on a periodicity of a semi-persistent scheduling, SPS, configuration associated with each of first and second pluralities of HARQ-ACK bits.

According to one or more embodiments of this aspect, each of the at least one deferred HARQ-ACK bit has a respective deferral value less than a maximum deferral value, where the respective deferral value is determined based on a delay from the respective downlink time slot to the first uplink time slot.

According to one or more embodiments of this aspect, modifying the first HARQ-ACK codebook includes at least one of appending the selected at least one deferred HARQ-ACK bit to the first HARQ-ACK codebook, and prepending at least one deferred HARQ-ACK bit to the first HARQ-ACK codebook.

According to one or more embodiments of this aspect, modifying the first HARQ-ACK codebook includes generating a deferred HARQ-ACK codebook based on the at least one deferred HARQ-ACK bit, and at least one of appending the deferred HARQ-ACK codebook to the first HARQ-ACK codebook and prepending the deferred HARQ-ACK codebook to the first HARQ-ACK codebook.

According to one or more embodiments of this aspect, the at least one deferred HARQ-ACK bit includes a plurality of deferred HARQ-ACK bits, the generating the deferred HARQ-ACK codebook including aggregating the plurality of deferred HARQ-ACK bits.

According to one or more embodiments of this aspect, modifying of the first HARQ-ACK codebook based on the at least one deferred HARQ-ACK bit includes determining the at least one deferred HARQ-ACK bit based on a periodicity of a semi-persistent scheduling, SPS, configuration associated with the at least one deferred HARQ-ACK bit.

According to another aspect of the present disclosure, a method implemented in a network node configured to communicate with a wireless device is provided. The method includes transmitting to the wireless device a time slot configuration which includes a first uplink time slot and a plurality of downlink time slots. The method further includes receiving a modified first HARQ-ACK codebook from the wireless device during the first uplink time slot, where the modified first HARQ-ACK codebook includes a first plurality of HARQ-ACK bits associated with a first HARQ-ACK codebook and at least one deferred HARQ-ACK bit associated with a second plurality of HARQ-ACK bits. Each of the first plurality of HARQ-ACK bits is mapped to the first uplink time slot based on a respective timing parameter, and each of the second plurality of HARQ-ACK bits is mapped to a respective downlink time slot of the plurality of downlink time slots based on a respective timing parameter.

According to one or more embodiments of this aspect, the method further includes causing a first downlink transmission to the wireless device on a first downlink time slot of the plurality of downlink time slots, where the first downlink transmission is associated with at least one of the first plurality of HARQ-ACK bits, and causing a second downlink transmission to the wireless device on a second downlink time slot of the plurality of downlink time slots, where the second downlink transmission is associated with at least one of the second plurality of HARQ-ACK bits.

According to one or more embodiments of this aspect, each of the respective timing parameters is based on a periodicity of a semi-persistent scheduling, SPS, configuration associated with each of first and second pluralities of HARQ-ACK bits.

According to one or more embodiments of this aspect, each of the at least one deferred HARQ-ACK bit has a respective deferral value less than a maximum deferral value, where the respective deferral value is associated with a delay from the respective downlink time slot to the first uplink time slot.

According to one or more embodiments of this aspect, the modified first HARQ-ACK codebook includes the at least one deferred HARQ-ACK bit, the at least one deferred HARQ-ACK bit being at least one of appended to the first HARQ-ACK codebook, and prepended to the first HARQ-ACK codebook.

According to one or more embodiments of this aspect, the modified first HARQ-ACK codebook includes a deferred HARQ-ACK codebook associated with the at least one deferred HARQ-ACK bit, the deferred HARQ-ACK codebook being at least one of appended to the first HARQ-ACK codebook, and prepended to the first HARQ-ACK codebook.

According to one or more embodiments of this aspect, the at least one deferred HARQ-ACK bit includes a plurality of deferred HARQ-ACK bits, the deferred HARQ-ACK codebook including an aggregation of the plurality of deferred HARQ-ACK bits.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart illustrating example methods implemented in a communication system including a host computer, a network node and a wireless device for receiving user data from the wireless device at a host computer according to some embodiments of the present disclosure;

FIG. 11 is a flowchart illustrating example methods implemented in a communication system including a host computer, a network node and a wireless device for receiving user data at a host computer according to some embodiments of the present disclosure;

FIG. 13 is a flowchart of another example process in a network node according to some embodiments of the present disclosure;

FIG. 15 is a flowchart of another example process in a wireless device according to some embodiments of the present disclosure;

FIG. 23 is a diagram of a HARQ codebook mismatch between a wireless device and network node with SPS release and deferral according to some embodiments of the present disclosure.

DETAILED DESCRIPTION

Figure 1:
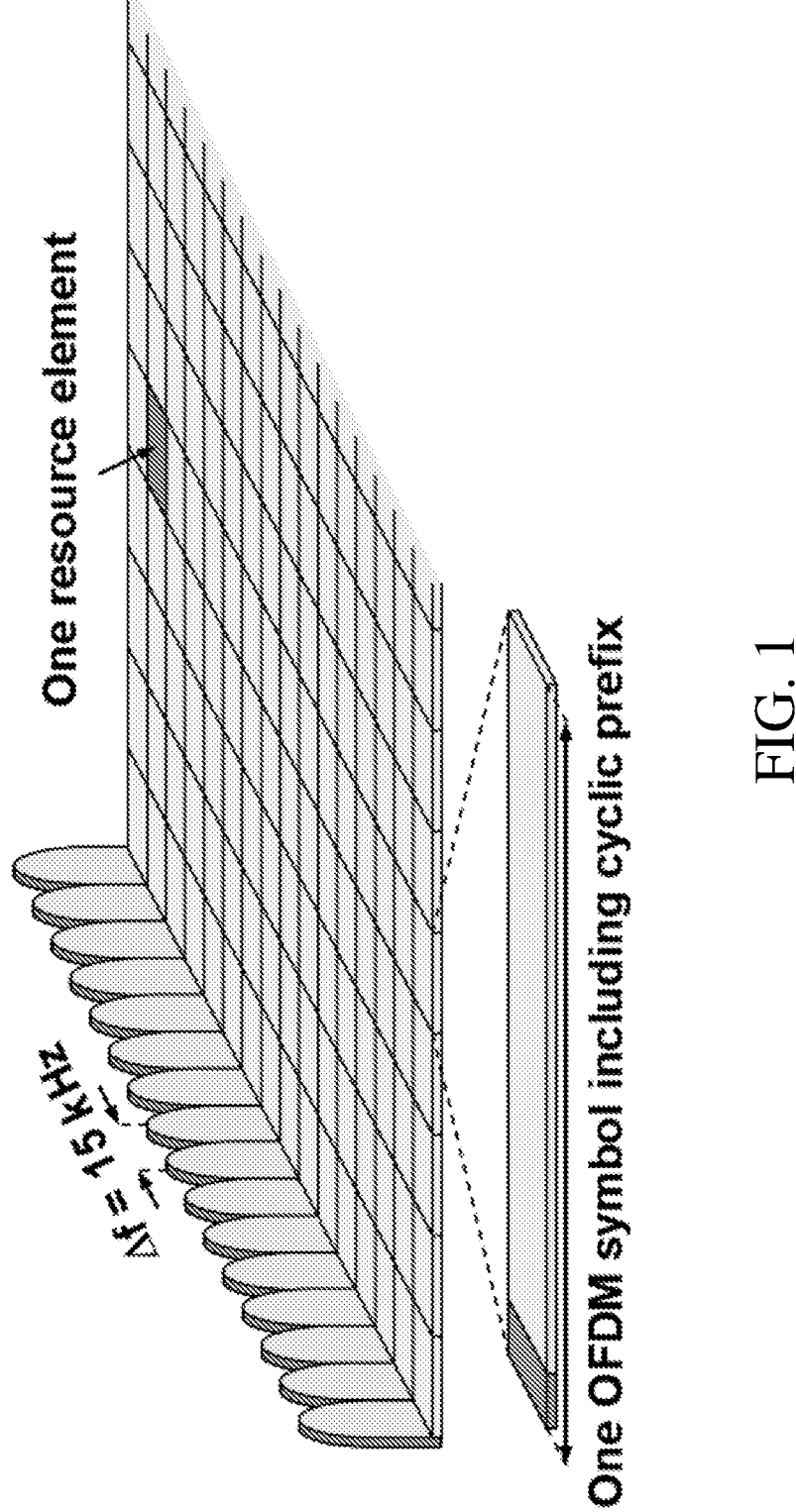
FIG. 1 is an example radio resource in NR.
Figure 2:
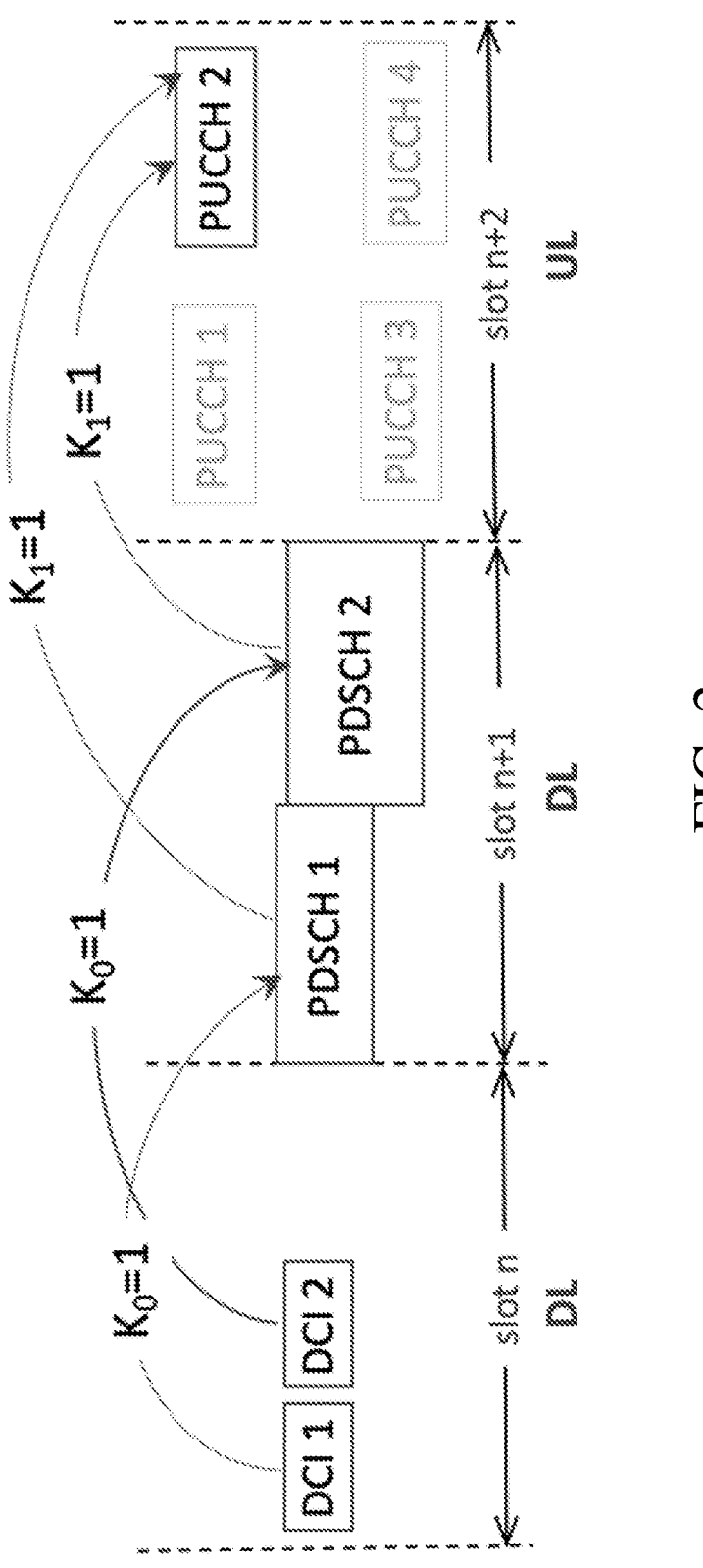
FIG. 2 is an example transmission timeline.
Figure 3:
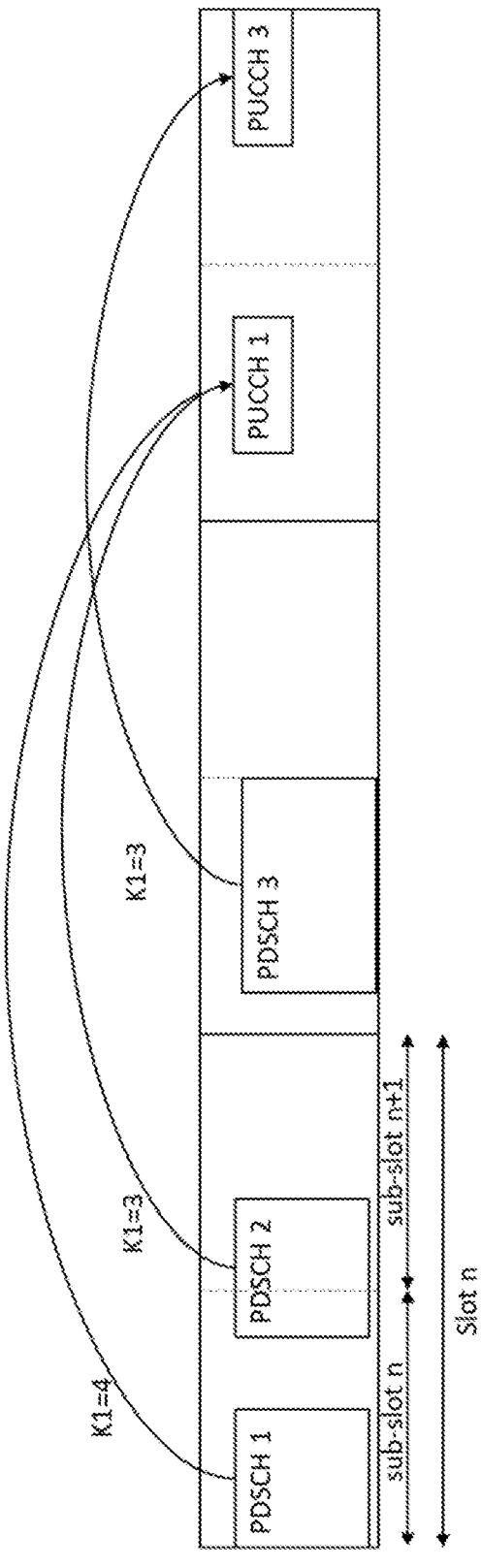
FIG. 3 is a diagram of a K1 indication based on sub-slots with "7-symbol*2" configuration for 2 PUCCHs in two sub-slots that carry the HARQ feedback of PDSCH transmissions.
Figures 4, 5:
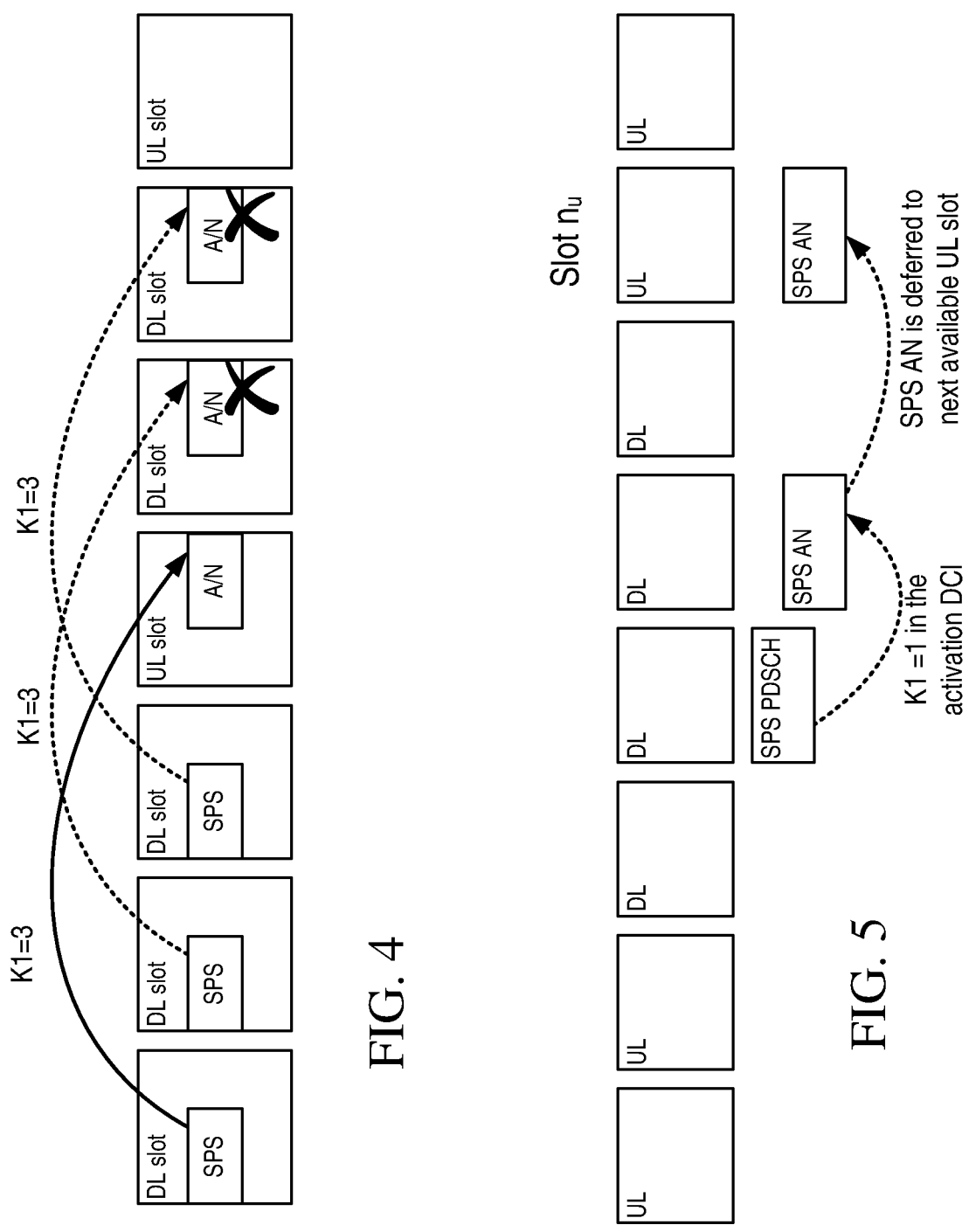
FIG. 4 is a diagram of mismatch of SPS periodicity and TDD pattern with indicated K1.
FIG. 5 is a diagram of SPS HARQ-ACK deferral.

Before describing in detail example embodiments, it is noted that the embodiments reside primarily in combinations of apparatus components and processing steps related to modified slot timing values for HARQ transmission such as, for example, deferred HARQ transmission.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, the phrase at least one of A and B corresponds to A and/or B.

The term "slot" is used herein as a resource unit in which HARQ-ACK feedback is transmitted.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide modified slot timing values for HARQ transmission such as, for example, deferred HARQ transmission.

Figure 6:
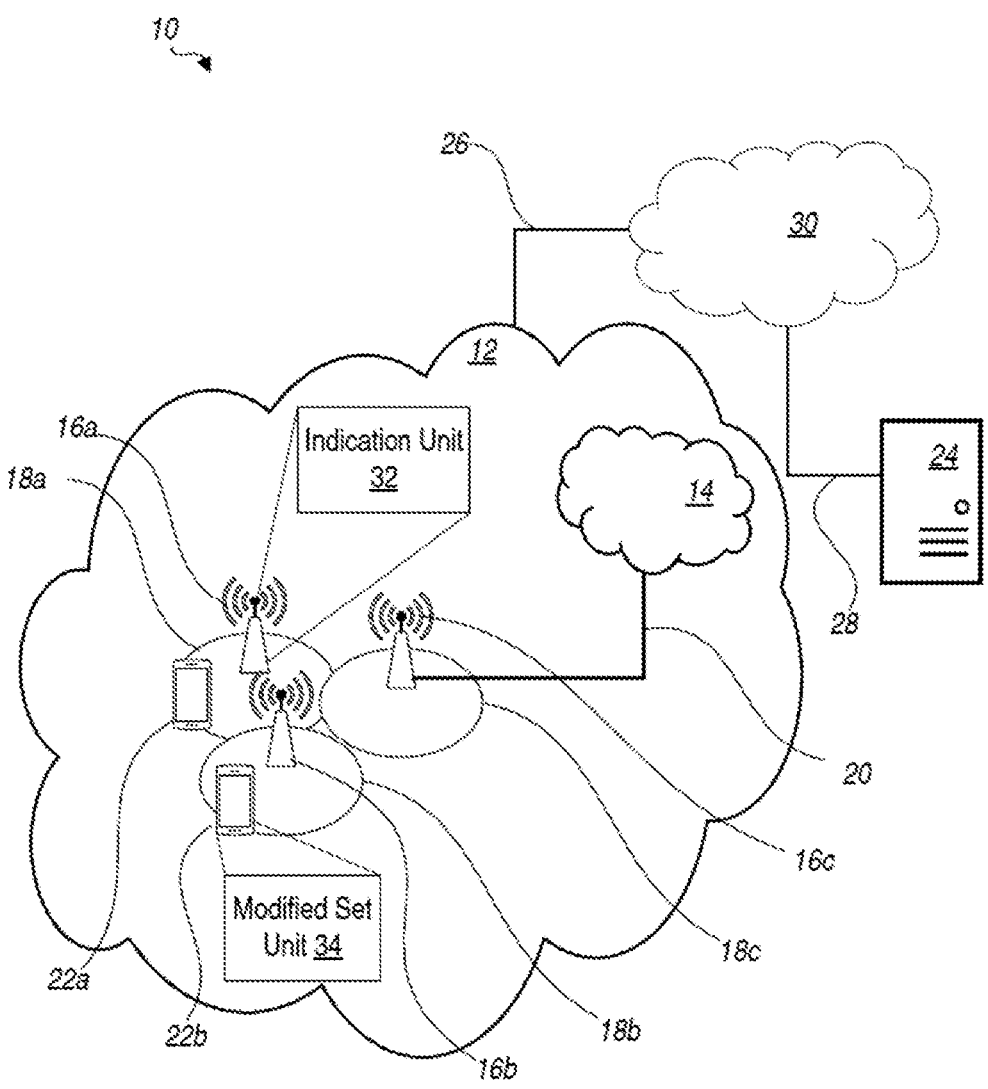
FIG. 6 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to perform one or more network node 16 functions as described herein such as with respect to modified slot timing values for HARQ transmission such as, for example, deferred HARQ transmission. A wireless device 22 is configured to include a modified set unit 34 which is configured to perform one or more wireless device 22 functions as described herein such as with respect to modified slot timing values for HARQ transmission such as, for example, deferred HARQ transmission.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, forward, relay, transmit, receive, process, store, analyze, etc., information related to modified slot timing values for HARQ transmission such as, for example, deferred HARQ transmission.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 functions as described herein such as with respect to modified slot timing values for HARQ transmission such as, for example, deferred HARQ transmission.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a modified set unit 34 configured to perform one or more wireless device 22 functions as described herein such as with respect to modified slot timing values for HARQ transmission such as, for example, deferred HARQ transmission.

Figure 7:
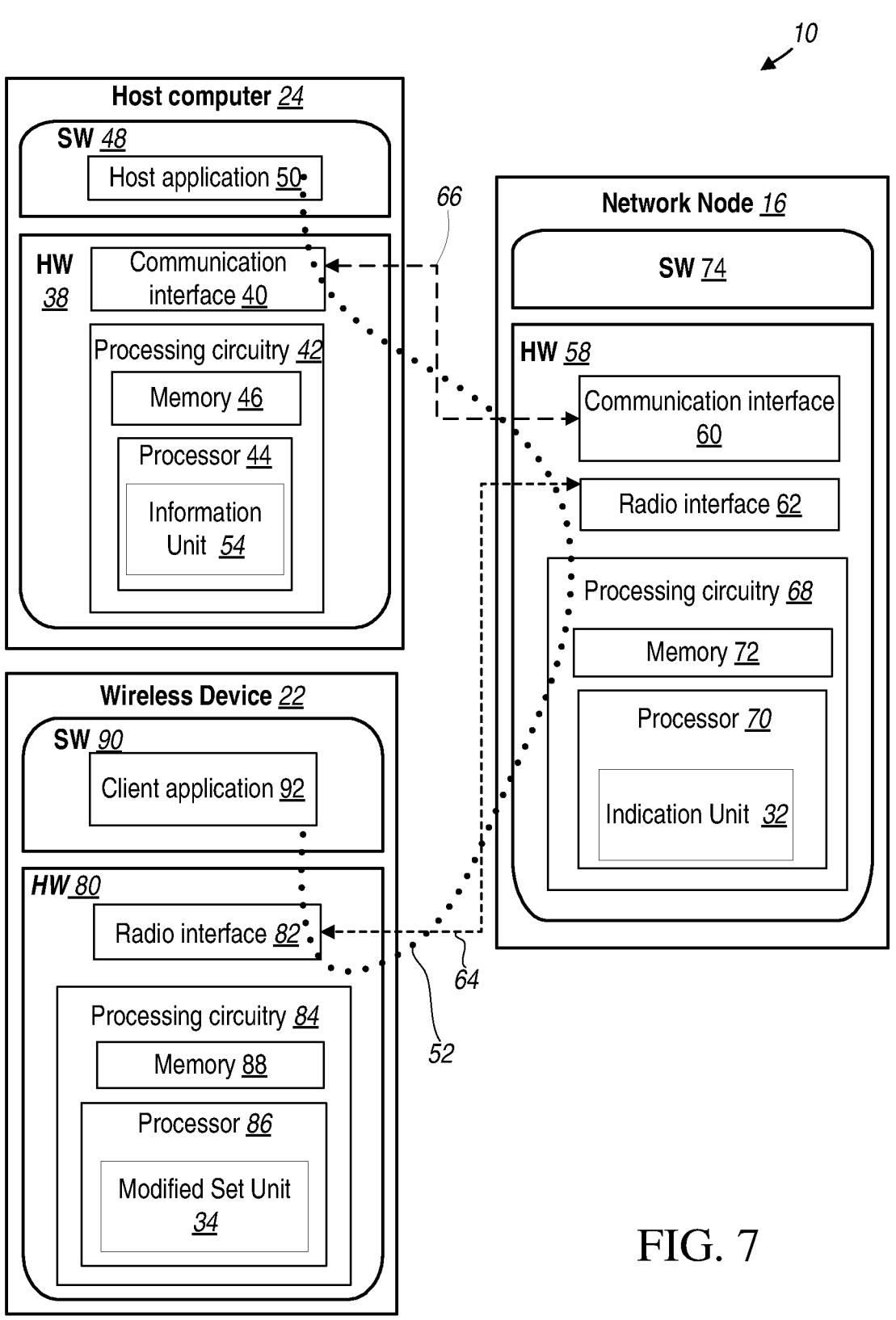
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as indication unit 32, and modified set unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 8, 9:
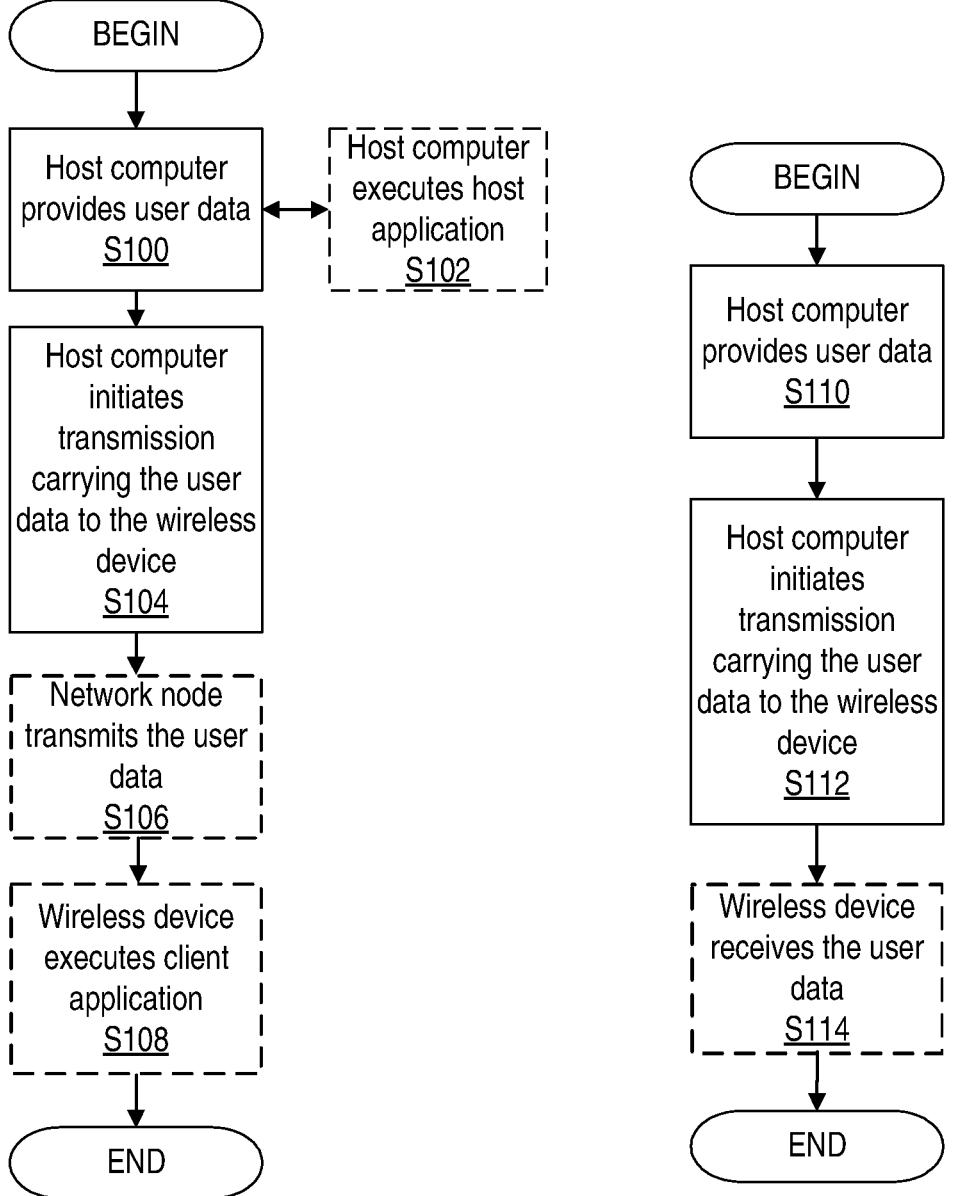
FIG. 8 is a flowchart illustrating example methods implemented in a communication system including a host computer, a network node and a wireless device for executing a client application at a wireless device according to some embodiments of the present disclosure.
FIG. 9 is a flowchart illustrating example methods implemented in a communication system including a host computer, a network node and a wireless device for receiving user data at a wireless device according to some embodiments of the present disclosure.

FIG. 8 is a flowchart illustrating an example method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 9 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 10 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 11 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 12:
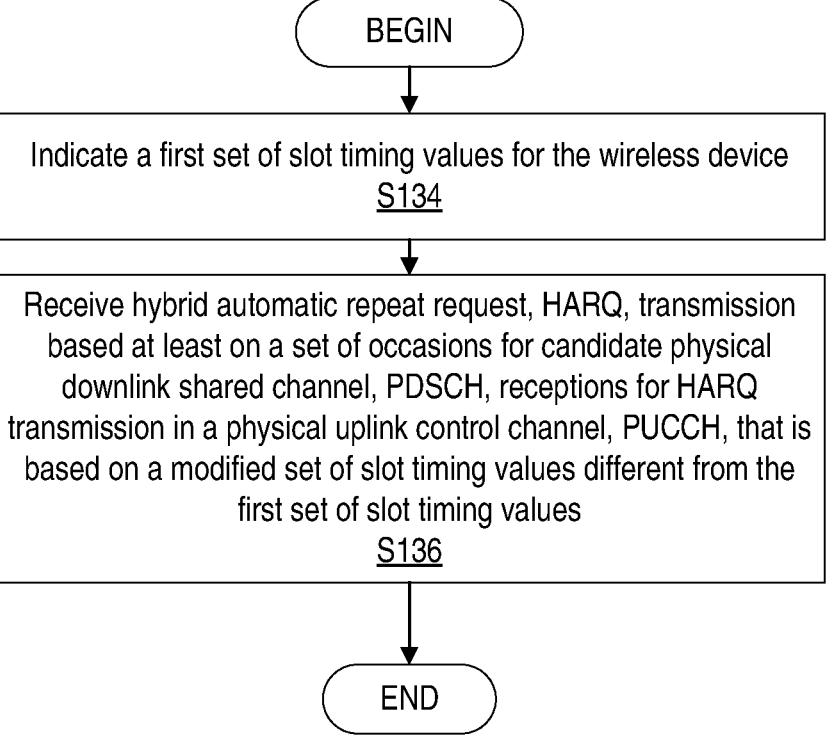
FIG. 12 is a flowchart of an example process in a network node according to some embodiments of the present disclosure.

FIG. 12 is a flowchart of an example process in a network node 16 according to some embodiments of the present disclosure. One or more blocks described herein may be performed by one or more elements of network node 16 such as by one or more of processing circuitry 68 (including the indication unit 32), processor 70, radio interface 62 and/or communication interface 60. Network node 16 is configured to indicate (Block S134) a first set of slot timing values for the wireless device 22, as described herein. Network node 16 is configured to receive (Block S136) hybrid automatic repeat request, HARQ, transmission based at least on a set of occasions for candidate physical downlink shared channel, PDSCH, receptions for HARQ transmission in a physical uplink control channel, PUCCH, that is based on a modified set of slot timing values different from the first set of slot timing values, as described herein.

According to one or more embodiments, the modified set of slot timing values are based at least on a union of a second set of slot timing values and the first set of slot timing values, the second set of slot timing values being based at least on a periodicity of semi-persistent scheduling, SPS, configuration. According to one or more embodiments, the modified set of slot timing values includes slot timing values absent from the first set of slot timing values. According to one or more embodiments, the modified set of slot timing values is based at least on actual deferred semi-persistent scheduling, SPS, hybrid automatic repeat request, HARQ, bits.

According to one or more embodiments, the processing circuitry 68 is further configured to receive a number of the actual deferred semi-persistent scheduling, SPS, HARQ bits that are appended to the set of occasions. According to one or more embodiments, the processing circuitry 68 is further configured to receive encoded known bit values for semi-persistent scheduling, SPS, hybrid automatic repeat request, HARQ, bits for a same SPS configuration that would have been transmitted in a same uplink slot had a downlink SPS not been released.

FIG. 13 is a flowchart of another example process in a network node 16 according to some embodiments of the present disclosure. One or more blocks described herein may be performed by one or more elements of network node 16 such as by one or more of processing circuitry 68 (including the indication unit 32), processor 70, radio interface 62 and/or communication interface 60. Network node 16 is configured to cause a transmission (Block S138), to the wireless device 22, of a time slot configuration including a first uplink time slot and a plurality of downlink time slots. Network node 16 is configured to receive (Block S140) receive a modified first HARQ-ACK codebook from the wireless device 22 during the first uplink time slot, the modified first HARQ-ACK codebook including a first plurality of HARQ-ACK bits associated with a first HARQ-ACK codebook and at least one deferred HARQ-ACK bit associated with a second plurality of HARQ-ACK bits, each of the first plurality of HARQ-ACK bits being mapped to the first uplink time slot based on a respective timing parameter, each of the second plurality of HARQ-ACK bits being mapped to a respective downlink time slot of the plurality of downlink time slots based on a respective timing parameter, as described herein.

According to one or more embodiments, the network node 16 is further configured to cause a first downlink transmission to the wireless device 22 on a first downlink time slot of the plurality of downlink time slots, where the first downlink transmission is associated with at least one of the first plurality of HARQ-ACK bits, and to cause a second downlink transmission to the wireless device 22 on a second downlink time slot of the plurality of downlink time slots, where the second downlink transmission is associated with at least one of the second plurality of HARQ-ACK bits.

According to one or more embodiments, each of the respective timing parameters is based on a periodicity of a semi-persistent scheduling, SPS, configuration associated with each of first and second pluralities of HARQ-ACK bits.

According to one or more embodiments, each of the at least one deferred HARQ-ACK bit has a respective deferral value less than a maximum deferral value, where the respective deferral value is associated with a delay from the respective downlink time slot to the first uplink time slot.

According to one or more embodiments, the modified first HARQ-ACK codebook includes the at least one deferred HARQ-ACK bit, the at least one deferred HARQ-ACK bit being at least one of appended to the first HARQ-ACK codebook, and prepended to the first HARQ-ACK codebook.

According to one or more embodiments, the modified first HARQ-ACK codebook includes a deferred HARQ-ACK codebook associated with the at least one deferred HARQ-ACK bit, the deferred HARQ-ACK codebook being at least one of appended to the first HARQ-ACK codebook, and prepended to the first HARQ-ACK codebook.

According to one or more embodiments, the at least one deferred HARQ-ACK bit includes a plurality of deferred HARQ-ACK bits, the deferred HARQ-ACK codebook including an aggregation of the plurality of deferred HARQ-ACK bits.

Figure 14:
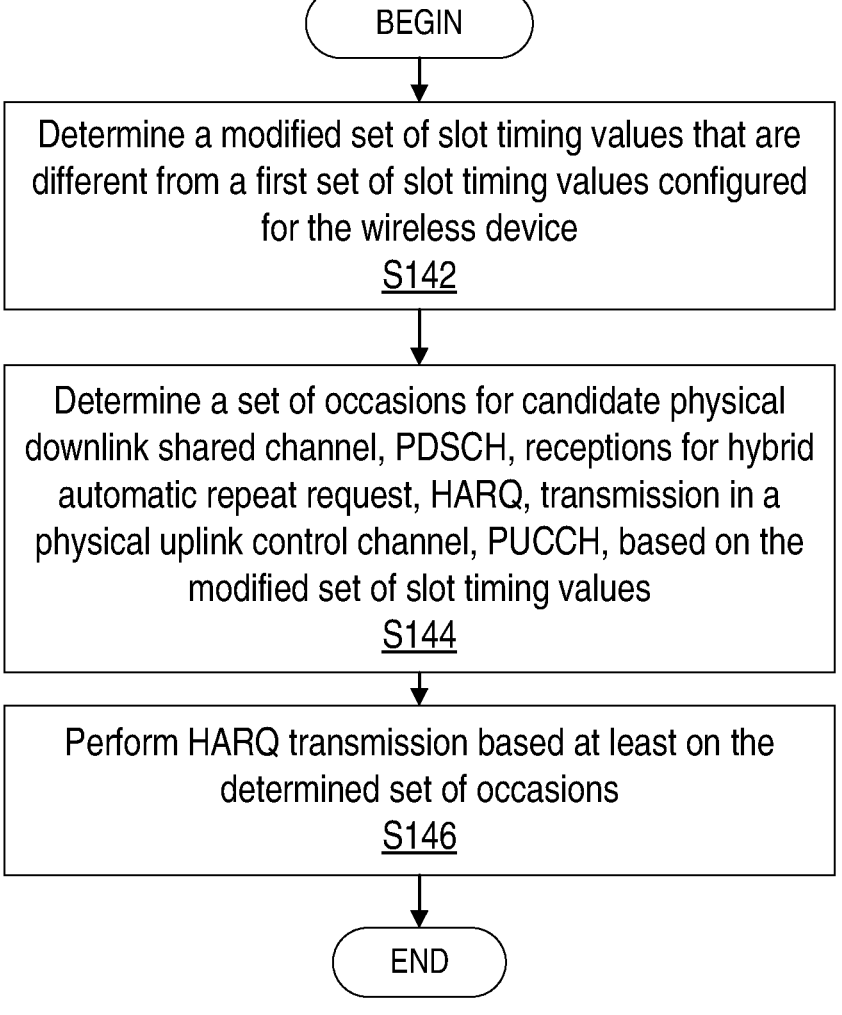
FIG. 14 is a flowchart of an example process in a wireless device according to some embodiments of the present disclosure.

FIG. 14 is a flowchart of an example process in a wireless device 22 according to some embodiments of the present disclosure. One or more blocks described herein may be performed by one or more elements of wireless device 22 such as by one or more of processing circuitry 84 (including the modified set unit 34), processor 86, radio interface 82 and/or communication interface 60. Wireless device 22 is configured to determine (Block S142) a modified set of slot timing values that are different from a first set of slot timing values configured for the wireless device 22, as described herein. Wireless device 22 is configured to determine (Block S144) a set of occasions for candidate physical downlink shared channel, PDSCH, receptions for hybrid automatic repeat request, HARQ, transmission in a physical uplink control channel, PUCCH, based on the modified set of slot timing values, as described herein. Wireless device 22 is configured to perform (Block S146) HARQ transmission based at least on the determined set of occasions, as described herein.

According to one or more embodiments, the modified set of slot timing values are based at least on a union of a second set of slot timing values and the first set of slot timing values, the second set of slot timing values being based at least on a periodicity of semi-persistent scheduling, SPS, configuration. According to one or more embodiments, the modified set of slot timing values includes slot timing values absent from the first set of slot timing values. According to one or more embodiments, the modified set of slot timing values is based at least on actual deferred semi-persistent scheduling, SPS, hybrid automatic repeat request, HARQ, bits.

According to one or more embodiments, the processing circuitry 84 is further configured to append a number of the actual deferred semi-persistent scheduling, SPS, HARQ bits to the set of occasions. According to one or more embodiments, the processing circuitry 84 is further configured to encode known bit values for semi-persistent scheduling, SPS, hybrid automatic repeat request, HARQ, bits for a same SPS configuration that would have been transmitted in a same uplink slot had a downlink SPS not been released.

FIG. 15 is a flowchart of another example process in a wireless device 22 in communication with a network node 16. One or more blocks described herein may be performed by one or more elements of wireless device 22 such as by one or more of processing circuitry 84 (including the modified set unit 34), processor 86, radio interface 82 and/or communication interface 60. Wireless device 22 is configured to generate (Block S148) a first HARQ-ACK codebook for a first uplink time slot, where the first HARQ-ACK codebook includes a first plurality of HARQ-ACK bits. Wireless device 22 is configured to determine (Block S150) a second plurality of HARQ-ACK bits, where each of the second plurality of HARQ-ACK bits is associated with a respective timing parameter, and each of the second plurality of HARQ-ACK bits is mapped to a respective downlink time slot of a plurality of downlink time slots based on the respective timing parameter. Wireless device 22 is configured to modify (Block S152) the first HARQ-ACK codebook based on at least one deferred HARQ-ACK bit of the second plurality of HARQ-ACK bits. Wireless device 22 is configured to cause transmission (Block S154) of the modified first HARQ-ACK codebook during the first uplink time slot, as described herein.

According to one or more embodiments, each of the first plurality of HARQ-ACK bits is associated with a respective timing parameter, and each of the first plurality of HARQ-ACK bits is mapped to the first uplink time slot based on the respective timing parameter.

According to one or more embodiments, each of the respective timing parameters is based on a periodicity of a semi-persistent scheduling, SPS, configuration associated with each of first and second pluralities of HARQ-ACK bits.

According to one or more embodiments, each of the at least one deferred HARQ-ACK bit has a respective deferral value less than a maximum deferral value, where the respective deferral value is determined based on a delay from the respective downlink time slot to the first uplink time slot.

According to one or more embodiments, modifying the first HARQ-ACK codebook includes at least one of appending the selected at least one deferred HARQ-ACK bit to the first HARQ-ACK codebook, and prepending at least one deferred HARQ-ACK bit to the first HARQ-ACK codebook.

According to one or more embodiments, modifying the first HARQ-ACK codebook includes generating a deferred HARQ-ACK codebook based on the at least one deferred HARQ-ACK bit, and at least one of appending the deferred HARQ-ACK codebook to the first HARQ-ACK codebook and prepending the deferred HARQ-ACK codebook to the first HARQ-ACK codebook.

According to one or more embodiments, the at least one deferred HARQ-ACK bit includes a plurality of deferred HARQ-ACK bits, the generating the deferred HARQ-ACK codebook including aggregating the plurality of deferred HARQ-ACK bits.

According to one or more embodiments, modifying of the first HARQ-ACK codebook based on the at least one deferred HARQ-ACK bit includes determining the at least one deferred HARQ-ACK bit based on a periodicity of a semi-persistent scheduling, SPS, configuration associated with the at least one deferred HARQ-ACK bit.

Having generally described arrangements for modified slot timing values for HARQ transmission such as, for example, deferred HARQ transmission, details for these arrangements, functions and processes are provided as follows, and which may be implemented by the network node 16, wireless device 22 and/or host computer 24.

Some embodiments provide modified slot timing values for HARQ transmission such as, for example, deferred HARQ transmission. One or more embodiments described herein are equally applicable to cases where HARQ-ACK feedback transmission is in a sub-slot, or in a slot with duration less than 14 symbols or is associated with sub-slot configuration. One or more wireless device 22 functions described below may be performed by one or more of processing circuitry 84, processor 86, radio interface 82, modified set unit 34, etc. One or more network node 16 functions described below may be performed by one or more of processing circuitry 68, processor 70, radio interface 62, indication unit 32, etc.

The following embodiments relates to how the wireless device 22 determines a set of occasions for candidate PDSCH receptions for which the wireless device 22 can transmit corresponding HARQ-ACK information in a PUCCH in slot $n_U$ if SPS HARQ-ACK deferral is enabled. One or more embodiments may correspond to some changes made to the specification in Section 9.1.2.1 of 3GPP TS 38.213.

Determination of a Set of Occasions for Candidate PDSCH Receptions for which the Wireless Device 22 Transmits Corresponding HARQ-ACK Information in a PUCCH in Slot $n_U$ Based on a Modified Set of Slot Timing Values K1.

In one non-limiting embodiment, the determination of a set of occasions for candidate PDSCH receptions for which the wireless device 22 can transmit corresponding HARQ-ACK information in a PUCCH in slot $n_U$ is based on the modified set of slot timing values K1 associated with the active UL bandwidth part (BWP) such that the modified set includes new $K_1$ values which are not previously in the set of configured values.

In one non-limiting embodiment, in determining a set of occasions for candidate PDSCH receptions for which the wireless device 22 can transmit corresponding HARQ-ACK information in a PUCCH in slot $n_U$, the wireless device 22 determines a second set of K1 values corresponding to possible deferred SPS HARQ-ACK transmitted in slot $n_U$. The modified set of slot timing values K1 is then determined by a union of the second set and the set of configured slot timing values K1.

In the above embodiment, the wireless device 22 determines a second set of K1 values corresponding to possible deferred SPS HARQ-ACK transmitted in slot $n_U$ where the values in the second set are not smaller than the minimum value allowed for deferral, i.e., $K_1+K_{def, min}$ and are not larger than the maximum value allowed for deferral, i.e., $K_1+K_{def, max}$, where $K_{def, min}$ and $K_{def, max}$ are the minimum and maximum allowed additional slot offset values due to deferral from the original $K_1$ value.

In the above embodiment, the wireless device 22 determines a second set of K1 values corresponding to possible deferred SPS HARQ-ACK transmitted in slot $n_U$ where the values are not smaller than the minimum value in the set of configured slot timing values K1 and/or not larger than the maximum value in the set of configured slot timing values K1.

In the above embodiment, a second set of K1 values corresponding to possible deferred SPS HARQ-ACK transmitted in slot $n_U$ does not contain $K_1$ value, which makes at least one symbol of the PDSCH time resources in slot $n_U$–K1 overlaps with a configured UL symbol in the slot.

Figures 16, 17:
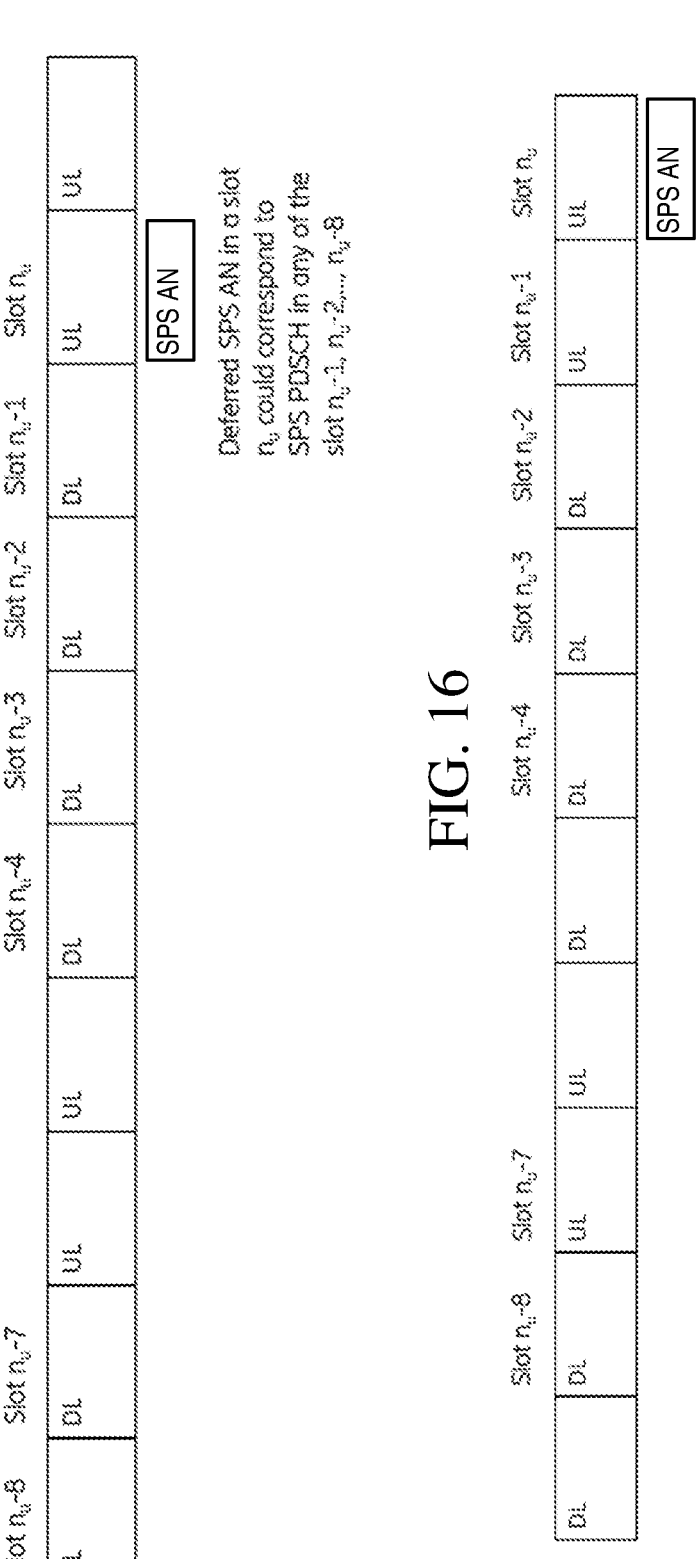
FIG. 16 is a diagram of an example deferred SPS HARQ-ACK according to some embodiments of the present disclosure.
FIG. 17 is a diagram of another example deferred SPS HARQ-ACK according to some embodiments of the present disclosure.

For example, assume that the wireless device 22 is configured to monitor PDCCH for DCI format for a serving cell where the set of $K_1$ is provided by dl-DataTo UL-ACK to be {1, 2, 4, 6}, i.e., the set of configured slot timing values K1 is {1, 2, 4, 6}, and that the maximum timing value allowed for SPS HARQ-ACK deferral $K_1+K_{def}$ is 8 slots. FIG. 16 is a diagram of how the wireless device 22 may determine a second set of K1 values corresponding to possible deferred SPS HARQ-ACK transmitted in slot $n_U$. Since the deferred SPS AN in a slot $n_u$ could correspond to SPS PDSCH in any of the slot $n_u$–1, $n_u$–2, . . . , $n_u$–8, the second set of K1 values is {1, 2, 3, 4, 7, 8}. Note that the reason that the values 5 and 6 are excluded from the set is because the slots $n_u$–5 and $n_u$–6 correspond to UL slots which are not valid for SPS PDSCH transmission. Finally, by a union of the second set and the set of configured slot timing values K1, the modified set of slot timing values K1 is determined to be {1, 2, 3, 4, 6, 7, 8}.

In another example, assume that the wireless device 22 is configured to monitor PDCCH for DCI format for a serving cell where the set of $K_1$ is provided by dl-DataToUL-ACK to be {1, 2, 4, 6}, i.e., the set of configured slot timing values K1 is {1, 2, 4, 6}, and that the maximum timing value allowed for SPS HARQ-ACK deferral $K_1+K_{def}$ is equal to 6 slots, i.e., the maximum value in the configured set of $K_1$ values. FIG. 16 illustrates how the wireless device 22 determines a second set of K1 values corresponding to possible deferred SPS HARQ-ACK transmitted in slot $n_U$. Since the deferred SPS AN in a slot $n_u$ could correspond to SPS PDSCH in any of the slot $n_u$–1, $n_u$–2, . . . , $n_u$–6, the second set of $K_1$ values is {1, 2, 3, 4}. Note that the reason that the values 5 and 6 are excluded from the set is because the slots $n_u$–5 and $n_u$–6 correspond to UL slots which are not valid for SPS PDSCH transmission. Finally, by a union of the second set and the set of configured slot timing values K1, the modified set of slot timing values K1 is determined to be {1, 2, 3, 4, 6}.

In yet another example, it is assumed that wireless device 22 is configured to monitor PDCCH for DCI format for a serving cell where the set of $K_1$ is provided by dl-DataTo UL-ACK to be {1, 2, 4, 6}, i.e., the set of configured slot timing values K1 is {1, 2, 4, 6}, and that the maximum timing value allowed for SPS HARQ-ACK deferral $K_1+K_{def}$ is equal to 6 slots, i.e., the maximum value in the configured set of $K_1$ values. FIG. 17 is an example illustrating how the WD 22 may determine a second set of K1 values corresponding to possible deferred SPS HARQ-ACK transmitted in slot $n_U$. This example does not expect any of the deferred SPS HARQ-ACK to be transmitted in slot $n_u$ since SPS HARQ-ACK would have been deferred to slot $n_u$–1 instead (the next available UL slot). Thus, the second set of $K_1$ values is just an empty set. Finally, by a union of the second set and the set of configured slot timing values K1, the modified set of slot timing values K1 is determined to be {1, 2, 4, 6}.

In one non-limiting embodiment, in determining a set of occasions for candidate PDSCH receptions for which wireless device 22 can transmit corresponding HARQ-ACK information in a PUCCH in slot $n_U$, wireless device 22 determines a second set of K1 values corresponding to possible deferred SPS HARQ-ACK transmitted in slot $n_U$ by taking into account periodicity of a SPS configuration. The modified set of slot timing values K1 is then determined by a union of the second set and the set of configured slot timing values K1.

Figure 18:
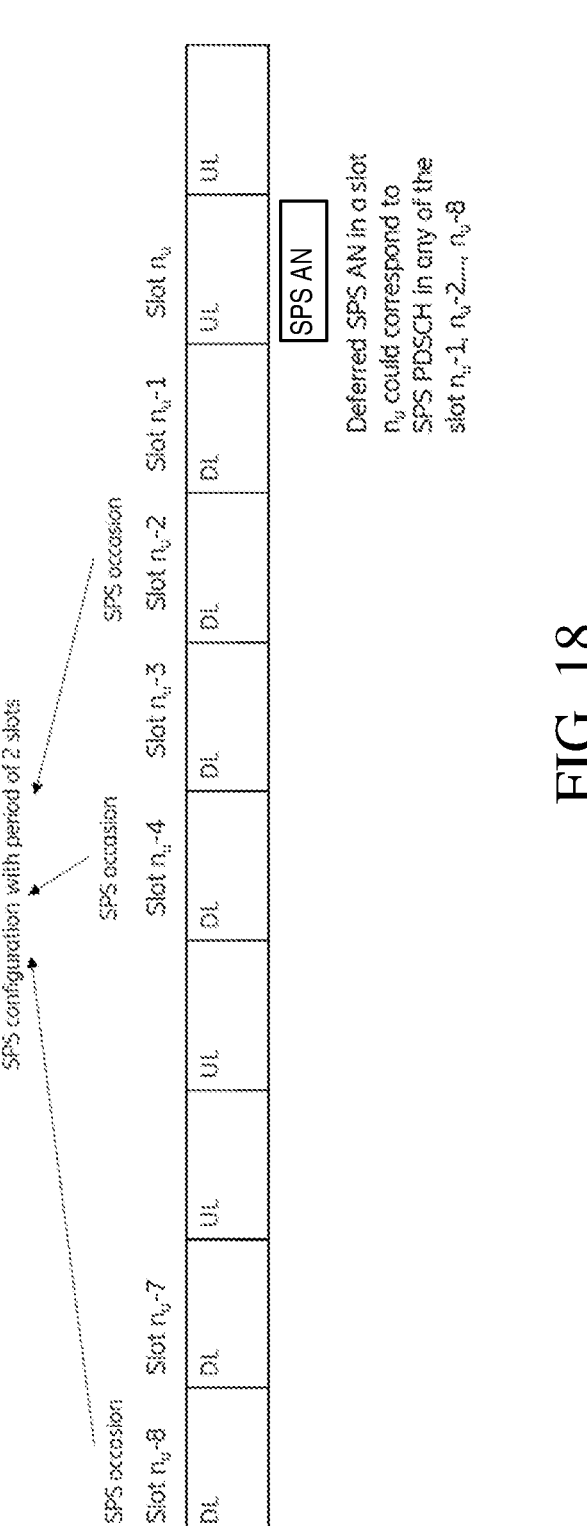
FIG. 18 is a diagram of another example deferred SPS HARQ-ACK according to some embodiments of the present disclosure.

For example, consider an example in FIG. 18 where there are SPS occasions of the SPS configuration in every other DL slot (slot $n_u$–8, $n_u$–4, $n_u$–2, . . . ) which is according to SPS period of 2 slots. Assume that the set of configured slot timing values K1 is {1, 2, 4, 6}, and that the maximum timing value allowed for SPS HARQ-ACK deferral $K_1+K_{def}$ is 8 slots. Since the deferred SPS AN in a slot $n_u$ could correspond to SPS PDSCH in any of the slot $n_u$–2, $n_u$–4, and $n_u$–8, the second set of $K_1$ values is {2, 4, 8}. Note that here only possible $K_1$ values corresponding to possible deferred SPS HARQ-ACK transmitted in slot $n_U$ taking into account periodicity of a SPS configuration are included. Finally, by a union of the second set and the set of configured slot timing values K1, the modified set of slot timing values K1 is determined to be {1, 2, 4, 6, 8}.

Figures 19, 20:
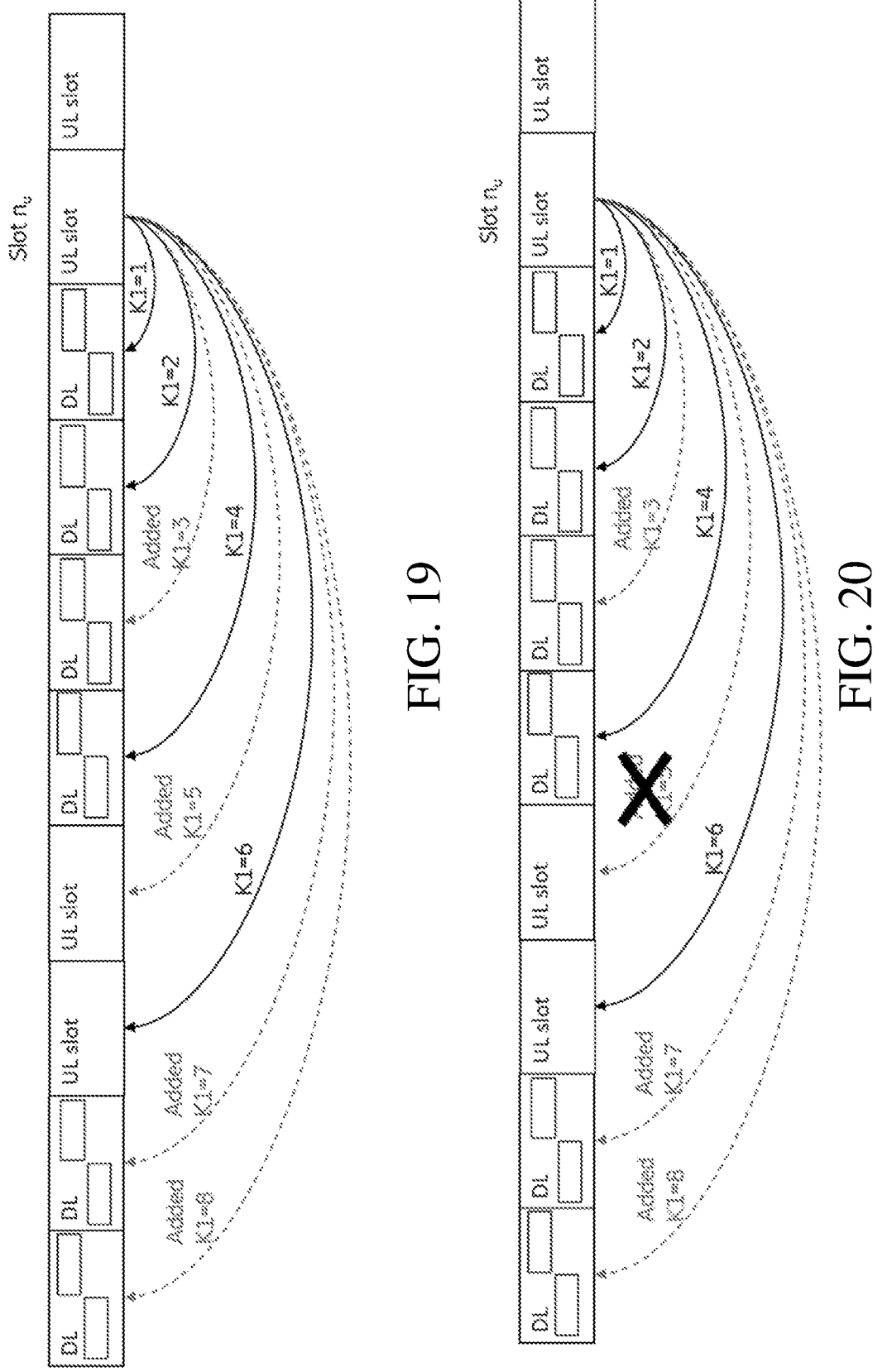
FIG. 19 is a diagram of an example of obtaining the modified set according to some embodiments of the present disclosure.
FIG. 20 is a diagram of another example of obtaining the modified set according to some embodiments of the present disclosure.

In one non-limiting embodiment, when the set of configured slot timing values does not contain all consecutive values, the modified set is formed so that it contains all consecutive values by including missing $K_1$ values in between the minimum value in the set of configured slot timing values and the maximum timing value allowed for SPS HARQ-ACK deferral. For example, FIG. 19 is a diagram where it is assumed that the set of configured slot timing values K1 is {1, 2, 4, 6}, and the maximum timing value allowed for SPS HARQ-ACK deferral $K_1+K_{def}$ is 8 slots. The modified set of slot timing values K1 is then formed to be {1, 2, 3, 4, 5, 6, 7, 8}, where the values 3, 5, 7, and 8 are added, e.g., 3, 5, 7 and 8 were the "missing $K_1$ values."

In one version of the above embodiment, the added $K_1$ value to the modified set is excluded if at least one symbol of the PDSCH time resources in slot $n_U$–K1 overlaps with a configured UL symbol in the slot.

For example, FIG. 20 is a diagram where it is assumed that the set of configured slot timing values K1 is {1, 2, 4, 6}, and the maximum timing value allowed for SPS HARQ-ACK deferral $K_1+K_{def}$ is 8 slots. Since slot $n_U$–5 in this example is an UL slot which is not valid for DL transmission, the value $K_1$=5 is excluded from the modified set of slot timing values $K_1$. That is, the modified set of slot timing values $K_1$ is formed to be {1, 2, 3, 4, 6, 7, 8}, where the values 3, 7, and 8 are added. That is, invalid "missing $K_1$ values" are not added to the modified set.

Figure 21:
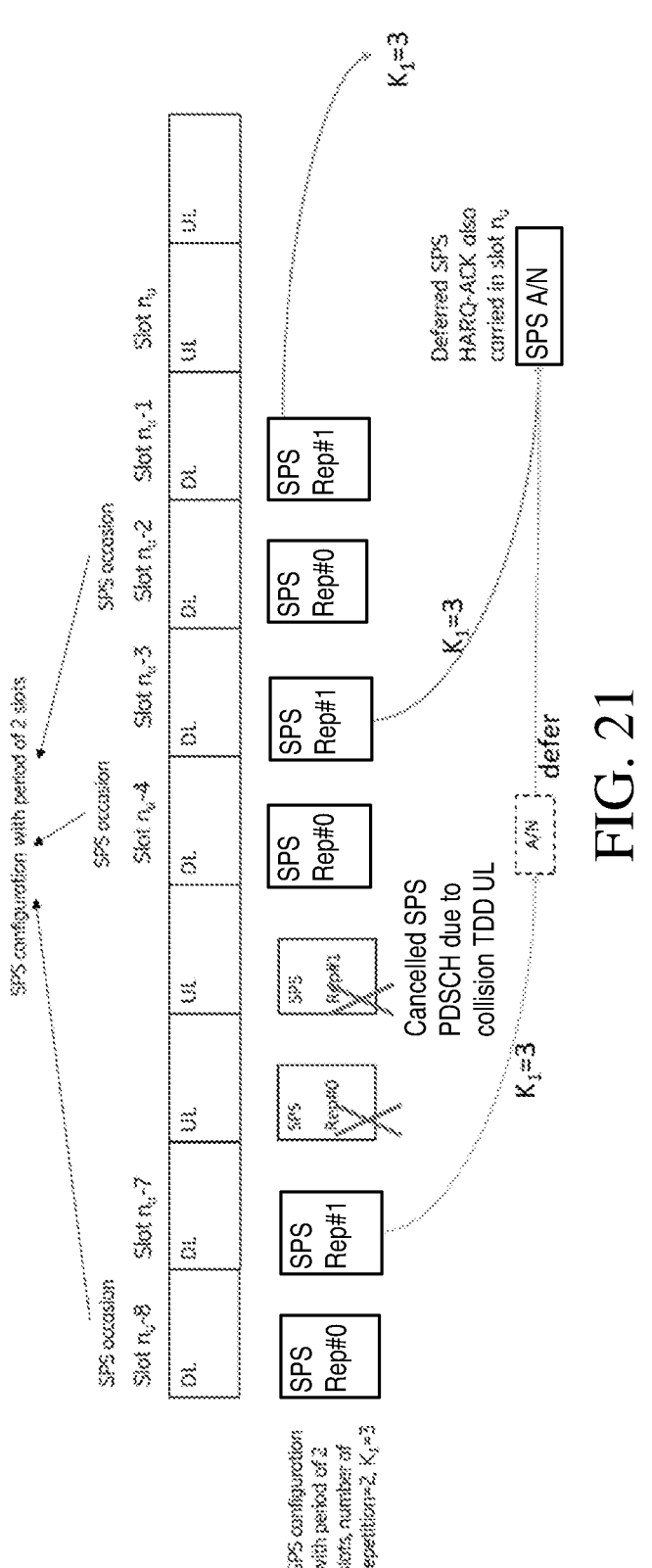
FIG. 21 is a diagram of an example SPS HARQ-ACK deferred to a slot according to some embodiments of the present disclosure.

In another embodiment, SPS with repetition is taken into account. For a given SPS configuration, the number of repetitions $$N_{PDSCH}^{repeat}$$

is provided by pdsch-AggregationFactor-r16 in sps-Config or, if pdsch-AggregationFactor-r16 is not included in sps-Config, by pdsch-AggregationFactor in pdsch-config. With the number of repetition $$N_{PDSCH}^{repeat} > 1,$$

for a given SPS configuration, the set of deferred HARQ-ACK bits is according to the slot that the last SPS PDSCH repetition is to be transmitted. This applies even if the last SPS PDSCH repetition is cancelled. In general, a SPS PDSCH transmission can be cancelled, and wireless device 22 is not expected to receive, for various reasons, for example, due to overlapping with DL symbol or DL slot in a TDD pattern, or due to collision with another SPS configuration. This is illustrated with an example in FIG. 21 that is a diagram of an example of SPS HARQ-ACK deferred to slot $n_u$, where SPS PDSCH is configured with repetition.

In another embodiment, more than one SPS configurations are activated. In this case, the deferred SPS HARQ-ACK for each configuration, which are deferred to the same slot $n_u$, are aggregated such as by wireless device 22 for transmission in slot $n_u$.

Figure 22:
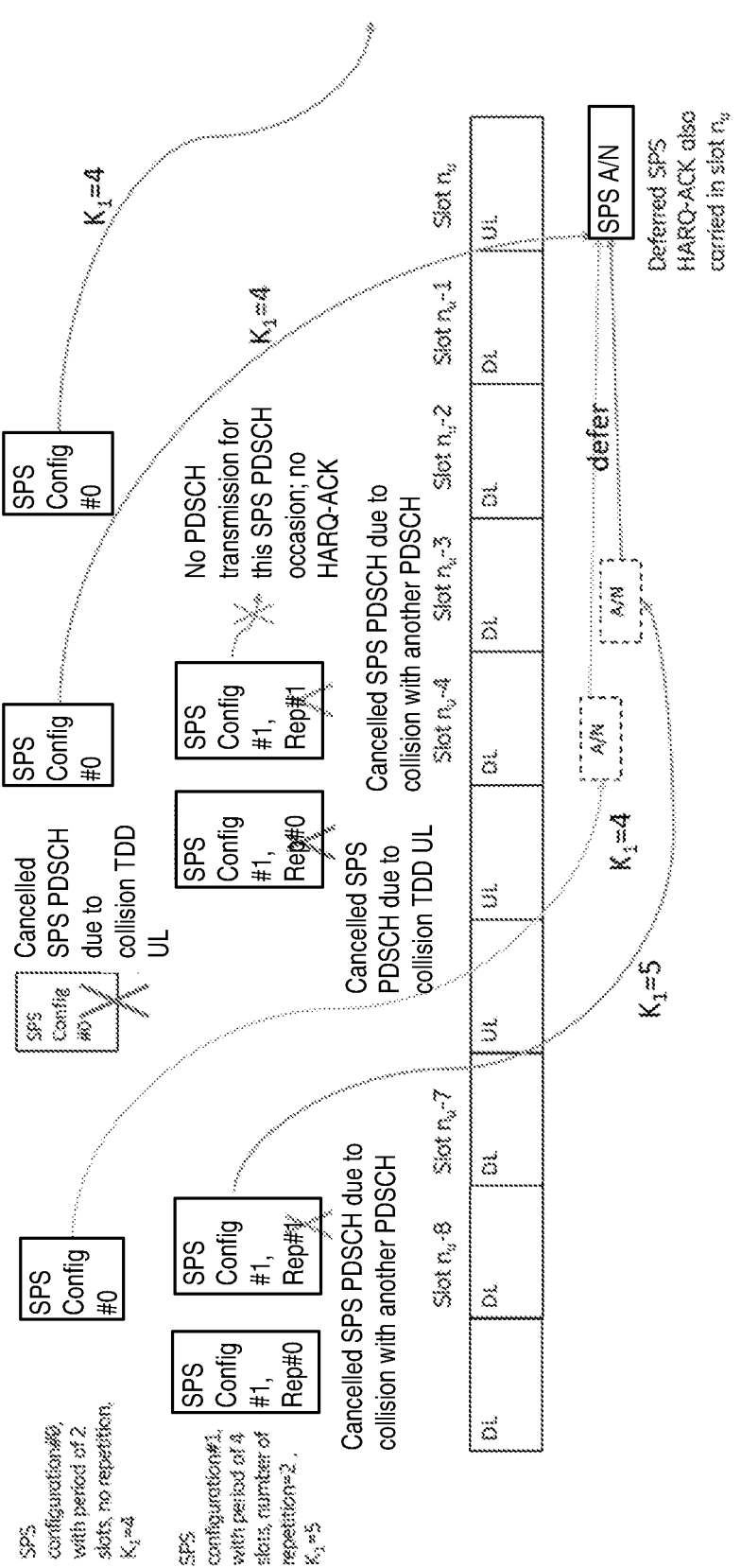
FIG. 22 is a diagram of another example SPS HARQ-ACK deferred to a slot according to some embodiments of the present disclosure.

When more than one SPS configurations are activated, it may happen that two or more SPS transmissions belonging to different configurations overlap, and some SPS transmission(s) are dropped. The dropping of colliding SPS transmissions of different configurations is performed slot-by-slot. The HARQ-ACK to be transmitted (including the deferred HARQ-ACK) for each SPS configuration is aggregated for transmission. FIG. 22 is a diagram of an example of SPS HARQ-ACK deferred to slot nu, where multiple SPS configurations are active and SPS configuration #1 has PDSCH with repetition.

Determination of a Set of Occasions for Candidate PDSCH Receptions for which Wireless Device 22 Transmits Corresponding HARQ-ACK Information in a PUCCH in Slot $n_U$ Based on the Actual Deferred SPS HARQ-ACK Bits As discussed above with respect to one example embodiment, wireless device 22 determines a set of occasions for candidate PDSCH receptions for which wireless device 22 can transmit corresponding HARQ-ACK information in a PUCCH in slot $n_U$ based on the modified set of slot timing values K1. By doing so, the set of occasions for candidate PDSCH receptions may include some PDSCH occasions which do not necessarily correspond to SPS PDSCH occasion since all TDRA entries corresponding to each $K_1$ value in the extended set, including those for dynamically schedule PDSCH are considered. This implies that there might be some redundant bits in the HARQ-ACK codebook.

In the embodiments of section, methods of determining a set of occasions for candidate PDSCH receptions for which wireless device 22 transmits corresponding HARQ-ACK information in a PUCCH in slot $n_U$ based on the actual deferred SPS HARQ-ACK bits are described. One or more embodiments described herein help ensure that additional redundancy in the codebook can be avoided.

In one non-limiting embodiment, wireless device 22 first determines a set of occasions for candidate PDSCH receptions for which wireless device 22 can transmit corresponding HARQ-ACK information in a PUCCH in slot $n_U$ based on the configured set of slot timing values K1 associated with the active UL BWP following the existing procedure. If SPS-HARQ-ACK deferral is enabled, the determined set of occasions, or the type 1 HARQ-ACK codebook, is further extended by appending or prepending the number of actual deferred SPS HARQ-ACK bits to be transmitted in slot $n_U$.

In one version of the above embodiment, the set of occasions, or the type 1 HARQ-ACK codebook, is extended by appending or prepending the number of actual deferred SPS HARQ-ACK bits transmitted in slot $n_U$ where the actual deferred SPS HARQ-ACK bits in slot $n_U$ are determined based on one or more of the following:

- a configured TDD pattern,
- a periodicity of the SPS configuration subject to deferral,
- configuration of invalid symbols/slots for deferred SPS HARQ-ACK,
- the radio resource control (RRC) configuration of other configured SPS configurations,
- the RRC configuration of other activated SPS configurations, and
- SCS of UL and DL slot.

In one embodiment, the procedure of appending (or prepending) deferral HARQ-ACK bits in type-2 codebook can be similar to appending procedure of SPS's HARQ-ACKs in type-2 codebook.

In Type-2 codebook, it can be considered as two attachments, where the first appended attachment contains HARQ-ACKs of dynamic PDSCHs, and in the $2^{nd}$/appended attachment, it contains the HARQ-ACKs of SPSs' PDSCHs.

Hence, using the same procedure, a codebook attachment is constructed but only containing deferred HARQ-ACK bits and it is appended to existing Type-1 codebook or prepending existing Type-1 codebook.

In one embodiment, the differed HARQ-ACK bits can be arranged (within the appended/prepended) attachment in type-1 codebook according to one or more of:

- Ascending/descending order of PDSCHs transmitted;
- Ascending/descending order of last repetition of PDSCHs transmitted;
- Ascending/descending order of first repetition of PDSCHs transmitted;
- Ascending/descending order of HPNs;
- Ascending/descending order of carriers of PDSCHs/HPNs;
- Ordering rule utilized for SPS HARQ-ACKs in Rel-16 for type-2 codebook; and
- Non-limiting combinations of above.

In one embodiment, the HARQ-ACK bits are not appended/prepended, rather following rule can be utilized

- All the PDSCHs' HARQ-ACKs pointing to slot $n_u$, will be assigned K1 accordingly (subject to gap between PDSCH and slot $n_u$), as illustrated in FIGS. 19 and 20, whether it's deferred or not deferred.
  - Based on existing 3GPP Rel-16 type-1 codebook construction procedure, the codebook is constructed.

In another embodiment, the deferred HARQ-ACK for SPS configurations are aggregated for each of the DL slot within the deferral slot range, that caused deferring of HARQ-ACK. For example, as illustrated in the example of FIG. 22, some HARQ-ACK bits are mapped to DL slots $\{n_u-4, n_u-3, n_u-2, n_u-1\}$ due to PDSCH-to-HARQ_feedback timing indicator, but these HARQ-ACK bits cannot be transmitted since these slots are DL slots. It is determined that HARQ-ACK mapped to these DL slots are to be carried by PUCCH or PUSCH in slot $n_u$. Then, SPS PDSCH HARQ-ACK mapped to each of the four DL slots are collected and concatenated to build the deferred SPS PDSCH HARQ-ACK codebook: (1) HARQ-ACK bits mapped to slot $n_u$–4; (2) HARQ-ACK bits mapped to slot $n_u$–3; (3) no HARQ-ACK bits mapped to slot $\{n_u$–2, $n_u$–1$\}$. Finally, the deferred SPS PDSCH HARQ-ACK codebook is appended to the HARQ-ACK codebook normally mapped to slot $n_u$(i.e., non-deferred HARQ-ACK codebook) for transmission.

As an example, the deferred SPS PDSCH HARQ-ACK codebook can be constructed using the pseudo-code below.

(b) Case 2: if UL slot and DL slot have different duration due to different SCS used for UL and DL, the procedure is modified to take this into account. The range of deferred HARQ-ACK bits, e.g., according to ($K_{def, min}$, $K_{def, max}$) is counted using UL slot duration. The HARQ-ACK bits are deferred is the PUCCH carrying them collide with DL symbols.

Acknowledgement of DL SPS release for HARQ-ACK deferral

When a DL SPS configuration is released by a DCI, a HARQ bit for the corresponding DL SPS is used to acknowledge the release. If this bit is deferred to an UL slot that would contain HARQ feedback for later DL SPS transmission for the same configuration, had it not been cancelled,

```
Set N_cells^DL to the number of serving cells configured to wireless device 22
Set N_c^SPS to the number of SPS PDSCH configuration configured to wireless device 22 for
serving cell c
Let the current uplink slot index be n_u,
Set j = 0 – HARQ-ACK information bit index
Set K= K_def, max
While K>=K_def, min
If slot (n_u – K) is designated for downlink transmission, and the SPS PSCH HARQ-ACK bits
mapped to slot (n_u – K) have not been transmitted, then: for SPS PDSCH reception, collect
HARQ-ACK bits mapped to slot (n_u – K) as follows.
        Set N_c^DL to the number of DL slots for SPS PDSCH reception on serving cell c
        with HARQ-ACK information multiplexed on the PUCCH
        Set c = 0 – serving cell index: lower indexes correspond to lower RRC indexes
        of corresponding cell
            while c < N_cells^DL
        Set s = 0 – SPS PDSCH configuration index: lower indexes correspond to
            lower RRC indexes of corresponding SPS configurations
            while s < N_c^SPS
                Set n_D = 0 – slot index
                    while n_D < N_c^DL
                        if {
                        a wireless device 22 is configured to receive SPS PDSCHs
                        from slot n_D – N_PDSCH^repeat + 1 to slot n_D for SPS PDSCH
                        configuration s on serving cell c, excluding SPS PDSCHs that
                        are not required to be received in any slot among overlapping
                        SPS PDSCHs, if any according to [3GPP TS 38.214], or based
                        on wireless device 22 capability for a number of PDSCH
                        receptions in a slot according to [3GPP TS 38.214], or due to
                        overlapping with a set of symbols indicated as uplink by tdd-
                        UL-DL-ConfigurationCommon or by tdd-UL-DL-
                        ConfigurationDedicated where N_PDSCH^repeat is provided by pdsch-
                        AggregationFactor-r16 in sps-Config or, if pdsch-
                        AggregationFactor-r16 is not included in sps-Config, by
                        pdsch-AggregationFactor in pdsch-config, and
                        HARQ-ACK information for the SPS PDSCH is associated
                        with the PUCCH of slot (n_u – K)
                        }
                        õ_j^ACK = HARQ-ACK information bit for this SPS PDSCH
                        reception
                        j = j + 1;
                    end if
                        n_D = n_D + 1;
                    end while
                    s = s + 1;
            end while
            c = c + 1;
        end while
    K=K–1
end
```

The same principle can be extended to cover the following variations:

(a) Case 1: a slot is partially for uplink transmission, and partially for downlink transmission. Then the HARQ-ACK bits are deferred only if the PUCCH carrying HARQ-ACK coincide with the DL symbols. HARQ-ACK bits are transmitted without deferral if the PUCCH carrying HARQ-ACK coincide with the UL symbols.

there could be codebook size mismatch between wireless device 22 and network node 16 in case wireless device 22 missed the PDCCH containing the DL SPS release. Network node 16 expects HARQ feedback only up to and including the release command, while wireless device 22 will transmit HARQ feedback also corresponding to the later DL SPS that it thinks were transmitted.

Figure 23:
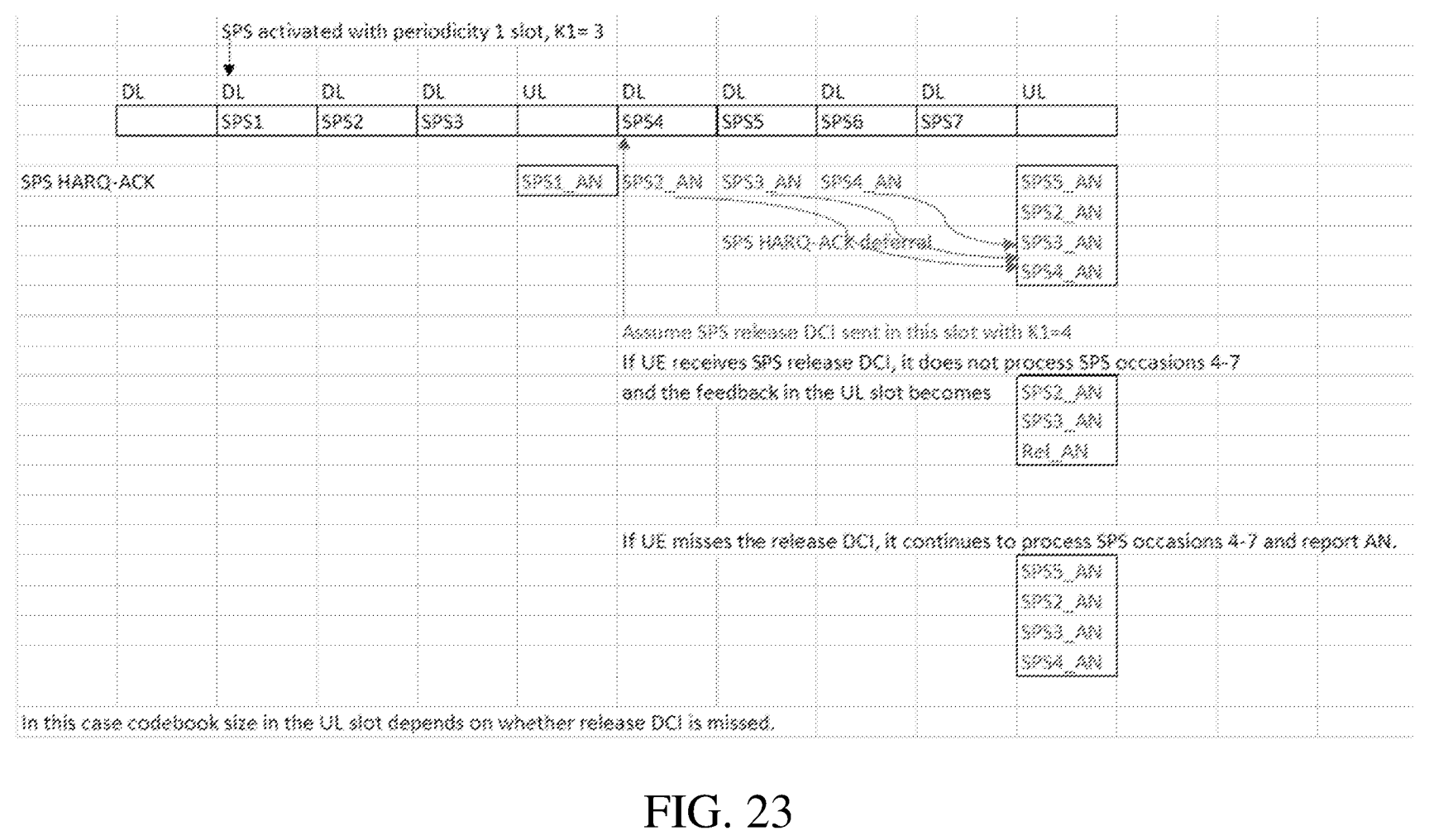

FIG. 23 is a diagram of an example of a HARQ codebook mismatch between wireless device 22 and network node 16 with SPS release and deferral. If there is no DL SPS release, then HARQ feedback for SPS2, SPS3, SPS4, and SPS5 would all be deferred and transmitted in the indicated UL slot. Now it is assumed that network node 16 releases the DL SPS, so that the last transmitted DL SPS is SPS3. Then the HARQ bit corresponding to SPS4 (SPS4_AN) is replaced by a bit that acknowledges the released (denoted by Rel_AN in FIG. 23). If wireless device 22 misses the PDCCH containing the DL SPS release command, then wireless device 22 reports 4 bits for this DL SPS configuration (corresponding to the SPS2, SPS3, SPS4, and SPS5 that wireless device 22 believes have been transmitted). Since network node 16 expects only HARQ feedback for 3 bits (SPS2, SPS3 and the release acknowledgement) the codebooks will have mismatched size and network node 16 will not be able to decode the HARQ feedback.

In one embodiment, the mismatch issue is mitigated by wireless device 22 encoding known bit values for HARQ bits corresponding to DL SPS PDSCHs for the same SPS configuration that would have been transmitted in the same UL slot, had the DL SPS not been released. In the example of FIG. 23, this means that wireless device 22 will encode four bits in the HARQ codebook, two bits corresponding to the transmitted SPS2 and SPS #, one bit acknowledging the release of the DL SPS, and one known bit that is used to match the codebook size to the size it would have been if no DL SPS release had been transmitted.

In one version of this embodiment, the known bits corresponding to untransmitted SPS are set to 1. This decreases the probability of confusion at network node 16, since wireless device 22 would decode random noise, or a transmission intended for another wireless device 22, and the probability of wireless device 22 interpreting this as a successful transmission is very small.

Some Examples

Example A1. A network node 16 configured to communicate with a wireless device (WD) 22, the network node 16 configured to, and/or comprising a radio interface and/or comprising processing circuitry configured to:

indicate a first set of slot timing values for the wireless device 22; and receive hybrid automatic repeat request, HARQ, transmission based at least on a set of occasions for candidate physical downlink shared channel, PDSCH, receptions for HARQ transmission in a physical uplink control channel, PUCCH, that is based on a modified set of slot timing values different from the first set of slot timing values.

Example A2. The network node 16 of Example A1, wherein the modified set of slot timing values are based at least on a union of a second set of slot timing values and the first set of slot timing values, the second set of slot timing values being based at least on a periodicity of semi-persistent scheduling, SPS, configuration.

Example A3. The network node 16 of Example A1, wherein the modified set of slot timing values includes slot timing values absent from the first set of slot timing values.

Example A4. The network node 16 of Example A1, wherein the modified set of slot timing values is based at least on actual deferred semi-persistent scheduling, SPS, hybrid automatic repeat request, HARQ, bits.

Example A5. The network node 16 of Example A4, wherein the processing circuitry is further configured to receive a number of the actual deferred semi-persistent scheduling, SPS, HARQ bits that are appended to the set of occasions.

Example A6. The network node 16 of Example A1, wherein the processing circuitry is further configured to receive encoded known bit values for semi-persistent scheduling, SPS, hybrid automatic repeat request, HARQ, bits for a same SPS configuration that would have been transmitted in a same uplink slot had a downlink SPS not been released.

Example B1. A method implemented in a network node 16, the method comprising:

indicating a first set of slot timing values for the wireless device 22; and receiving hybrid automatic repeat request, HARQ, transmission based at least on a set of occasions for candidate physical downlink shared channel, PDSCH, receptions for HARQ transmission in a physical uplink control channel, PUCCH, that is based on a modified set of slot timing values different from the first set of slot timing values.

Example B2. The method of Example B1, wherein the modified set of slot timing values are based at least on a union of a second set of slot timing values and the first set of slot timing values, the second set of slot timing values being based at least on a periodicity of semi-persistent scheduling, SPS, configuration.

Example B3. The method of Example B1, wherein the modified set of slot timing values includes slot timing values absent from the first set of slot timing values.

Example B4. The method of Example B1, wherein the modified set of slot timing values is based at least on actual deferred semi-persistent scheduling, SPS, hybrid automatic repeat request, HARQ, bits.

Example B5. The method of Example B4, further comprising receiving a number of the actual deferred semi-persistent scheduling, SPS, HARQ bits that are appended to the set of occasions.

Example B6. The method of Example B1, further comprising receiving encoded known bit values for semi-persistent scheduling, SPS, hybrid automatic repeat request, HARQ, bits for a same SPS configuration that would have been transmitted in a same uplink slot had a downlink SPS not been released.

Example C1. A wireless device 22 (WD) configured to communicate with a network node 16, the WD configured to, and/or comprising a radio interface and/or processing circuitry configured to:

determine a modified set of slot timing values that are different from a first set of slot timing values configured for the wireless device 22;

determine a set of occasions for candidate physical downlink shared channel, PDSCH, receptions for hybrid automatic repeat request, HARQ, transmission in a physical uplink control channel, PUCCH, based on the modified set of slot timing values; and perform HARQ transmission based at least on the determined set of occasions.

Example C2. The WD of Example C1, wherein the modified set of slot timing values are based at least on a union of a second set of slot timing values and the first set of slot timing values, the second set of slot timing values being based at least on a periodicity of semi-persistent scheduling, SPS, configuration.

Example C3. The WD of Example C1, wherein the modified set of slot timing values includes slot timing values absent from the first set of slot timing values.

Example C4. The WD of Example C1, wherein the modified set of slot timing values is based at least on actual deferred semi-persistent scheduling, SPS, hybrid automatic repeat request, HARQ, bits.

Example C5. The WD of Example C4, wherein the processing circuitry is further configured to append a number of the actual deferred semi-persistent scheduling, SPS, HARQ bits to the set of occasions.

Example C6. The WD of Example C1, wherein the processing circuitry is further configured to encode known bit values for semi-persistent scheduling, SPS, hybrid automatic repeat request, HARQ, bits for a same SPS configuration that would have been transmitted in a same uplink slot had a downlink SPS not been released.

Example D1. A method implemented in a wireless device 22 (WD), the method comprising:

determining a modified set of slot timing values that are different from a first set of slot timing values configured for the wireless device 22;

determining a set of occasions for candidate physical downlink shared channel, PDSCH, receptions for hybrid automatic repeat request, HARQ, transmission in a physical uplink control channel, PUCCH, based on the modified set of slot timing values; and performing HARQ transmission based at least on the determined set of occasions.

Example D2. The method of Example D1, wherein the modified set of slot timing values are based at least on a union of a second set of slot timing values and the first set of slot timing values, the second set of slot timing values being based at least on a periodicity of semi-persistent scheduling, SPS, configuration.

Example D3. The method of Example D1, wherein the modified set of slot timing values includes slot timing values absent from the first set of slot timing values.

Example D4. The method of Example D1, wherein the modified set of slot timing values is based at least on actual deferred semi-persistent scheduling, SPS, hybrid automatic repeat request, HARQ, bits.

Example D5. The method of Example D4, further comprising appending a number of the actual deferred semi-persistent scheduling, SPS, HARQ bits to the set of occasions.

Example D6. The method of Example D1, further comprising encoding known bit values for semi-persistent scheduling, SPS, hybrid automatic repeat request, HARQ, bits for a same SPS configuration that would have been transmitted in a same uplink slot had a downlink SPS not been released.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

BWP Bandwidth Part
CC Component Carrier
CCE Control Channel Element
CSI Channel State Information
DCI Downlink Control Information
DL Downlink
FDM Frequency Division Multiplexing
HARQ-ACK Hybrid automatic repeat request Acknowledgement
PDCCH Physical Downlink Control Channel
PDSCH Physical Downlink Shared Channel
PUCCH Physical Uplink Control Channel
PUSCH Physical Uplink Shared Channel
SPS Semi-Persistent Scheduling
SR Scheduling Request
TDM Time Division Multiplexing
TDD Time Division Duplex
TDRA Time Domain Resource Assignment
TRP Transmission Reception Point
UCI Uplink control information
UL Uplink
URLLC Ultra-Reliable Low-Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to communicate with a network node, the wireless device comprising:
processing circuitry configured to:
generate a first HARQ-ACK codebook for a first uplink time slot, the first HARQ-ACK codebook including a first plurality of HARQ-ACK bits;
determine a second plurality of HARQ-ACK bits, each of the second plurality of HARQ-ACK bits being associated with a respective timing parameter, each of the second plurality of HARQ-ACK bits being mapped to a respective downlink time slot of a plurality of downlink time slots based on the respective timing parameter, wherein each of the respective timing parameters is based on a periodicity of a semi-persistent scheduling, SPS, configuration associated with each of first and second pluralities of HARQ-ACK bits;
modify the first HARQ-ACK codebook based on at least one deferred HARQ-ACK bit of the second plurality of HARQ-ACK bits; and
cause transmission of the modified first HARQ-ACK codebook during the first uplink time slot.

2. The wireless device of claim 1, wherein each of the first plurality of HARQ-ACK bits is associated with a respective timing parameter, each of the first plurality of HARQ-ACK bits being mapped to the first uplink time slot based on the respective timing parameter.

3. The wireless device of claim 1, wherein each of the at least one deferred HARQ-ACK bit has a respective deferral value less than a maximum deferral value, the respective deferral value being determined based on a delay from the respective downlink time slot to the first uplink time slot.

4. The wireless device of claim 1, wherein the modifying of the first HARQ-ACK codebook includes at least one of:
appending the at least one deferred HARQ-ACK bit to the first HARQ-ACK codebook; and
prepending at least one deferred HARQ-ACK bit to the first HARQ-ACK codebook.

5. The wireless device of claim 1, wherein the modifying of the first HARQ-ACK codebook includes:
generating a deferred HARQ-ACK codebook based on the at least one deferred HARQ-ACK bit; and
at least one of:
appending the deferred HARQ-ACK codebook to the first HARQ-ACK codebook; and
prepending the deferred HARQ-ACK codebook to the first HARQ-ACK codebook.

6. The wireless device of claim 5, wherein the at least one deferred HARQ-ACK bit includes a plurality of deferred HARQ-ACK bits, the generating the deferred HARQ-ACK codebook including aggregating the plurality of deferred HARQ-ACK bits.

7. The wireless device of claim 1, wherein the modifying of the first HARQ-ACK codebook based on the at least one deferred HARQ-ACK bit includes determining the at least one deferred HARQ-ACK bit based on a periodicity of a semi-persistent scheduling, SPS, configuration associated with the at least one deferred HARQ-ACK bit.

8. A method implemented by a wireless device configured to communicate with a network node, the method comprising:
generating a first HARQ-ACK codebook for a first uplink time slot, the first HARQ-ACK codebook including a first plurality of HARQ-ACK bits;
determining a second plurality of HARQ-ACK bits, each of the second plurality of HARQ-ACK bits being associated with a respective timing parameter, each of the second plurality of HARQ-ACK bits being mapped to a respective downlink time slot of a plurality of downlink time slots based on the respective timing parameter, wherein each of the respective timing parameters is based on a periodicity of a semi-persistent scheduling, SPS, configuration associated with each of first and second pluralities of HARQ-ACK bits;
modifying the first HARQ-ACK codebook based on at least one deferred HARQ-ACK bit of the second plurality of HARQ-ACK bits; and
causing transmission of the modified first HARQ-ACK codebook during the first uplink time slot.

9. The method of claim 8, wherein each of the first plurality of HARQ-ACK bits is associated with a respective timing parameter, each of the first plurality of HARQ-ACK bits being mapped to the first uplink time slot based on the respective timing parameter.

10. The method of claim 8, wherein each of the at least one deferred HARQ-ACK bit has a respective deferral value less than a maximum deferral value, the respective deferral value being determined based on a delay from the respective downlink time slot to the first uplink time slot.

11. The method of claim 8, wherein the modifying of the first HARQ-ACK codebook includes at least one of:
appending the at least one deferred HARQ-ACK bit to the first HARQ-ACK codebook; and
prepending at least one deferred HARQ-ACK bit to the first HARQ-ACK codebook.

12. The method of claim 8, wherein the modifying of the first HARQ-ACK codebook includes:

generating a deferred HARQ-ACK codebook based on the at least one deferred HARQ-ACK bit; and at least one of:

appending the deferred HARQ-ACK codebook to the first HARQ-ACK codebook; and prepending the deferred HARQ-ACK codebook to the first HARQ-ACK codebook.

13. The method of claim 12, wherein the at least one deferred HARQ-ACK bit includes a plurality of deferred HARQ-ACK bits, the generating the deferred HARQ-ACK codebook including aggregating the plurality of deferred HARQ-ACK bits.

14. The method of claim 8, wherein the modifying of the first HARQ-ACK codebook based on the at least one deferred HARQ-ACK bit includes determining the at least one deferred HARQ-ACK bit based on a periodicity of a semi-persistent scheduling, SPS, configuration associated with the at least one deferred HARQ-ACK bit.

15. A network node configured to communicate with a wireless device, the network node comprising:

processing circuitry configured to:

cause a transmission, to the wireless device, of a time slot configuration including a first uplink time slot and a plurality of downlink time slots; and receive a modified first HARQ-ACK codebook from the wireless device during the first uplink time slot, the modified first HARQ-ACK codebook including a first plurality of HARQ-ACK bits associated with a first HARQ-ACK codebook and at least one deferred HARQ-ACK bit associated with a second plurality of HARQ-ACK bits, each of the first plurality of HARQ-ACK bits being mapped to the first uplink time slot based on a respective timing parameter, each of the second plurality of HARQ-ACK bits being mapped to a respective downlink time slot of the plurality of downlink time slots based on a respective timing parameter, wherein each of the respective timing parameters is based on a periodicity of a semi-persistent scheduling, SPS, configuration associated with each of first and second pluralities of HARQ-ACK bits.

16. A method implemented by a network node configured to communicate with a wireless device, the method comprising:

causing a transmission, to the wireless device, of a time slot configuration including a first uplink time slot and a plurality of downlink time slots; and receiving a modified first HARQ-ACK codebook from the wireless device during the first uplink time slot, the modified first HARQ-ACK codebook including a first plurality of HARQ-ACK bits associated with a first HARQ-ACK codebook and at least one deferred HARQ-ACK bit associated with a second plurality of HARQ-ACK bits, each of the first plurality of HARQ-ACK bits being mapped to the first uplink time slot based on a respective timing parameter, each of the second plurality of HARQ-ACK bits being mapped to a respective downlink time slot of the plurality of downlink time slots based on a respective timing parameter, wherein each of the respective timing parameters is based on a periodicity of a semi-persistent scheduling, SPS, configuration associated with each of first and second pluralities of HARQ-ACK bits.

17. The method of claim 16, wherein the method further comprises:

causing a first downlink transmission to the wireless device on a first downlink time slot of the plurality of downlink time slots, the first downlink transmission being associated with at least one of the first plurality of HARQ-ACK bits;

causing a second downlink transmission to the wireless device on a second downlink time slot of the plurality of downlink time slots, the second downlink transmission being associated with at least one of the second plurality of HARQ-ACK bits.

18. The method of claim 16, wherein each of the at least one deferred HARQ-ACK bit has a respective deferral value less than a maximum deferral value, the respective deferral value being associated with a delay from the respective downlink time slot to the first uplink time slot.

19. The method of claim 16, wherein the modified first HARQ-ACK codebook includes the at least one deferred HARQ-ACK bit, the at least one deferred HARQ-ACK bit being at least one of:

appended to the first HARQ-ACK codebook; and prepended to the first HARQ-ACK codebook.

20. The method of claim 16, wherein the modified first HARQ-ACK codebook includes a deferred HARQ-ACK codebook associated with the at least one deferred HARQ-ACK bit, the deferred HARQ-ACK codebook being at least one of:

appended to the first HARQ-ACK codebook; and prepended to the first HARQ-ACK codebook.

21. The method of claim 20, wherein the at least one deferred HARQ-ACK bit includes a plurality of deferred HARQ-ACK bits, the deferred HARQ-ACK codebook including an aggregation of the plurality of deferred HARQ-ACK bits.

* * * * *